US009709993B2

(12) United States Patent
Tanahashi

(10) Patent No.: US 9,709,993 B2
(45) Date of Patent: Jul. 18, 2017

(54) WIDE AREA SENSING SYSTEM, IN-FLIGHT DETECTION METHOD, AND NON-TRANSITORY COMPUTER READABLE MEDIUM STORING PROGRAM OF WIDE AREA SENSING SYSTEM

(71) Applicant: Kabushiki Kaisha TOPCON, Tokyo (JP)

(72) Inventor: Atsushi Tanahashi, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 134 days.

(21) Appl. No.: 14/859,974

(22) Filed: Sep. 21, 2015

(65) Prior Publication Data

US 2017/0003690 A1 Jan. 5, 2017

(30) Foreign Application Priority Data

Jun. 30, 2015 (JP) .................................. 2015-131667

(51) Int. Cl.
*G05D 1/10* (2006.01)
*B64C 13/20* (2006.01)
(Continued)

(52) U.S. Cl.
CPC ............. *G05D 1/102* (2013.01); *B64C 13/20* (2013.01); *B64C 29/0033* (2013.01);
(Continued)

(58) Field of Classification Search
CPC ......... B64C 19/00; B64C 27/26; B64C 27/30; B64C 27/00; B64C 13/20; B64C 29/0033;
(Continued)

(56) References Cited

U.S. PATENT DOCUMENTS 2,969,935 A 1/1961 Price
6,270,038 B1 8/2001 Cycon et al.
(Continued)

FOREIGN PATENT DOCUMENTS

EP 2 526 754 A1 11/2012
FR 2 997 924 A1 5/2014
(Continued)

OTHER PUBLICATIONS

European Search Report for Corresponding European Application No. 15186253.9 dated Nov. 18, 2016.

*Primary Examiner* — Behrang Badii
(74) *Attorney, Agent, or Firm* — Blank Rome LLP

(57) ABSTRACT

A wide area sensor system includes an unmanned airplane being switchable between an airplane mode for high speed flight and a VTOL mode for low speed flight, a state detection sensor provided in the unmanned airplane, the state detection sensor being driven to detect a state of a detection target, and an external control apparatus that controls flight of the unmanned airplane and driving of the state detection sensor. The external control apparatus performs high speed sensing by driving the state detection sensor while performing the high speed flight of the unmanned airplane in the airplane mode. The control apparatus performs low speed sensing by driving the state detection sensor while performing the low speed flight of the unmanned airplane in the VTOL mode.

8 Claims, 10 Drawing Sheets

(51) Int. Cl.
*B64C 29/00* (2006.01)
*B64C 39/02* (2006.01)
*B64C 19/00* (2006.01)
*B64C 27/30* (2006.01)
*B64C 27/26* (2006.01)
*G05D 1/00* (2006.01)
*B64C 27/00* (2006.01)

(52) U.S. Cl.
CPC .......... *B64C 39/024* (2013.01); *G05D 1/0011* (2013.01); *B64C 19/00* (2013.01); *B64C 27/00* (2013.01); *B64C 27/26* (2013.01); *B64C 27/30* (2013.01); *B64C 2201/021* (2013.01); *B64C 2201/024* (2013.01); *B64C 2201/123* (2013.01); *B64C 2201/126* (2013.01); *B64C 2201/127* (2013.01); *B64C 2201/146* (2013.01); *G05D 1/0088* (2013.01)

(58) Field of Classification Search
CPC ............ B64C 39/024; B64C 2201/021; G05D 1/0088; G05D 1/102
See application file for complete search history.

(56) References Cited

U.S. PATENT DOCUMENTS

| | | | |
|---|---|---|---|
| 6,622,962 B1 * | 9/2003 | White | B64C 27/26 244/12.3 |
| 8,948,936 B2 * | 2/2015 | Shue | B64C 19/00 700/29 |
| 2009/0132100 A1 | 5/2009 | Shibata | |
| 2011/0001020 A1 | 1/2011 | Forgac | |
| 2012/0298847 A1 | 11/2012 | Hayashi et al. | |
| 2013/0099048 A1 | 4/2013 | Fisher et al. | |
| 2013/0261853 A1 * | 10/2013 | Shue | B64C 19/00 701/3 |
| 2015/0314865 A1 | 11/2015 | Bermond et al. | |
| 2016/0306356 A1 | 10/2016 | Tebay | |

FOREIGN PATENT DOCUMENTS

| | | |
|---|---|---|
| FR | 2 999 150 A1 | 6/2014 |
| FR | 3 006 296 A1 | 12/2014 |
| JP | 2012-247235 A | 12/2012 |
| WO | WO 00/64736 | 11/2000 |
| WO | WO 2011/133944 A1 | 10/2011 |
| WO | WO 2015/082596 A1 | 6/2015 |

* cited by examiner

WIDE AREA SENSING SYSTEM, IN-FLIGHT DETECTION METHOD, AND NON-TRANSITORY COMPUTER READABLE MEDIUM STORING PROGRAM OF WIDE AREA SENSING SYSTEM

CROSS-REFERENCE TO RELATED APPLICATION

The present application is based on and claims priority to Japanese patent application No. 2015-131667, filed Jun. 30, 2015, the disclosure of which is hereby incorporated by reference herein in its entirety.

BACKGROUND

Technical Field

The present invention relates to a wide area sensor system, in-flight detection method, and a non-transitory computer readable medium storing program for detecting a state of a detection target ranging widely.

Description of Related Art

In the agricultural field, for example, it has been important to yield crops efficiently by accurately grasping the growth state of the crops to improve the yield of farm crops. In order to achieve that, there is a known technique that acquires a reflected measurement light from crops (plants (the target to be detected), determines a reflectivity of the measurement light against the crops, and detects the growth state of the crops based on the determined reflectivity.

For example, in the agricultural field, it is important to yield crops efficiently by accurately detecting the growth state of the crops to improve the yield of farm crops. Therefore, for example, the reflected light of measurement light from crops (plants (the growth state measurement target)) is received to obtain the reflectivity of the measurement light by the crops, and the growth state of the crops is detected based on the reflectivity.

Accordingly, a wavelength sensor apparatus for plants that receives reflected light from crops and is installed in an agricultural machine such as a tractor is taught by, for example, JP 2012-247235A. In such a conventional apparatus, simply moving along a farm land (agricultural field) in which crops are planted, the growth state of crops present on both sides of the route can be detected, thereby facilitating the detection of the growth state of the crops.

SUMMARY

However, in the conventional apparatus, since the tractor needs to move along the both sides of the crops to be detected, the area where the conventional apparatus can detect the growth state of the crops is limited. That is, the conventional apparatus is not suitable to be used to detect the growth state of crops ranging widely, for example crops growing in a large farm land.

An object of the present invention is, therefore, to provide a wider area sensing system for detecting a state of a detection target ranging widely.

To achieve the above object, an aspect of the present invention provides a wide area sensor system including an unmanned airplane being switchable between an airplane mode for high speed flight and a VTOL mode for low speed flight; a state detection sensor provided in the unmanned airplane, the state detection sensor being driven to detect a state of a detection target; and an external control apparatus that controls flight of the unmanned airplane and driving of the state detection sensor. Further, the external control apparatus performs high speed sensing by driving the state detection sensor while performing the high speed flight of the unmanned airplane in the airplane mode and performs low speed sensing by driving the state detection sensor while performing the low speed flight of the unmanned airplane in the VTOL mode.

DETAILED DESCRIPTION

Hereinafter, embodiments of a wide area sensor system, an in-flight detection method, and a non-transitory computer readable medium storing program according to the invention will be described with reference to the drawings.

Embodiment 1

Figure 5:
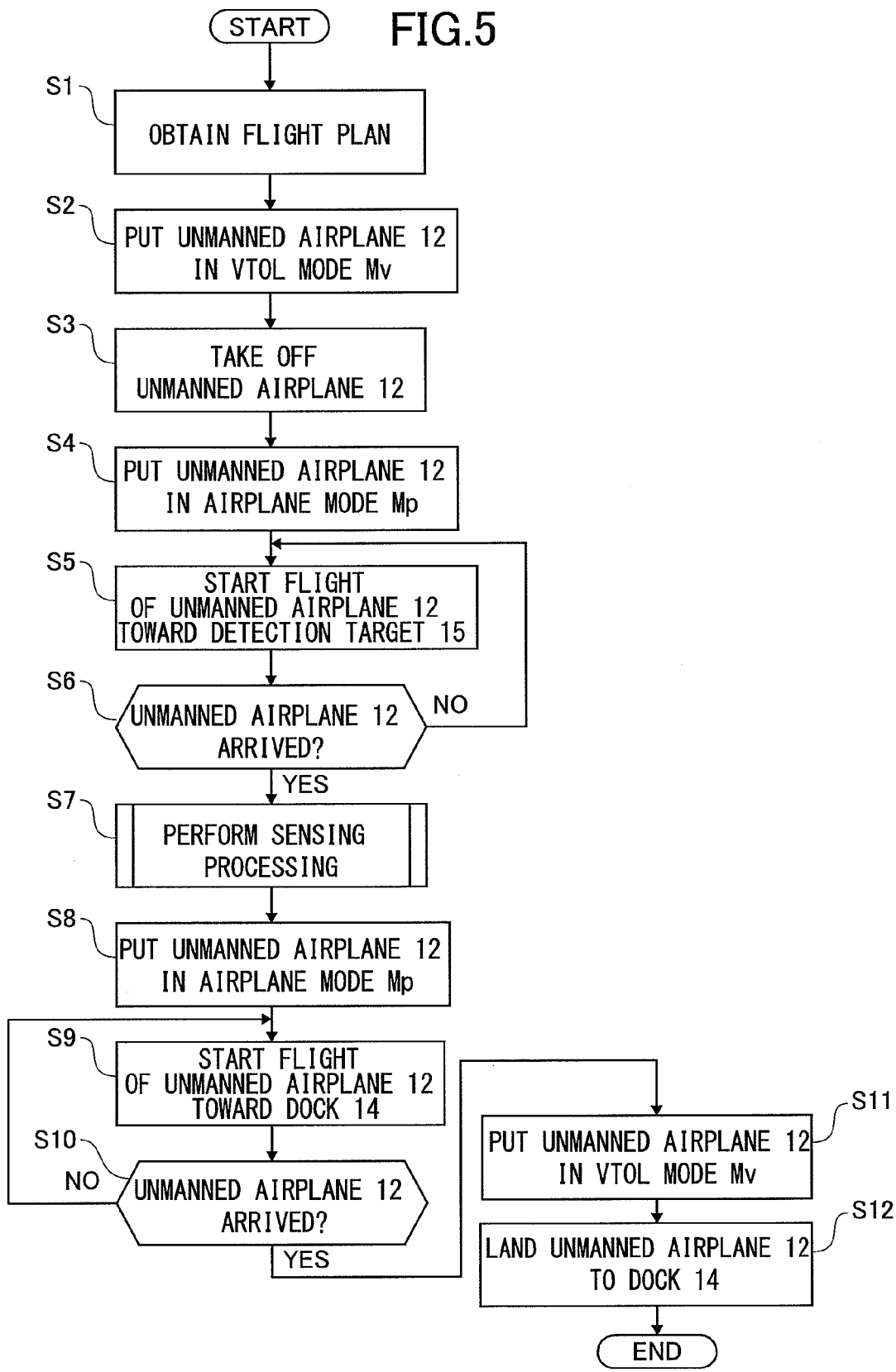
FIG. 5 is a flowchart showing an example of in-flight detection processing executed by an integrated control unit.
Figure 6:
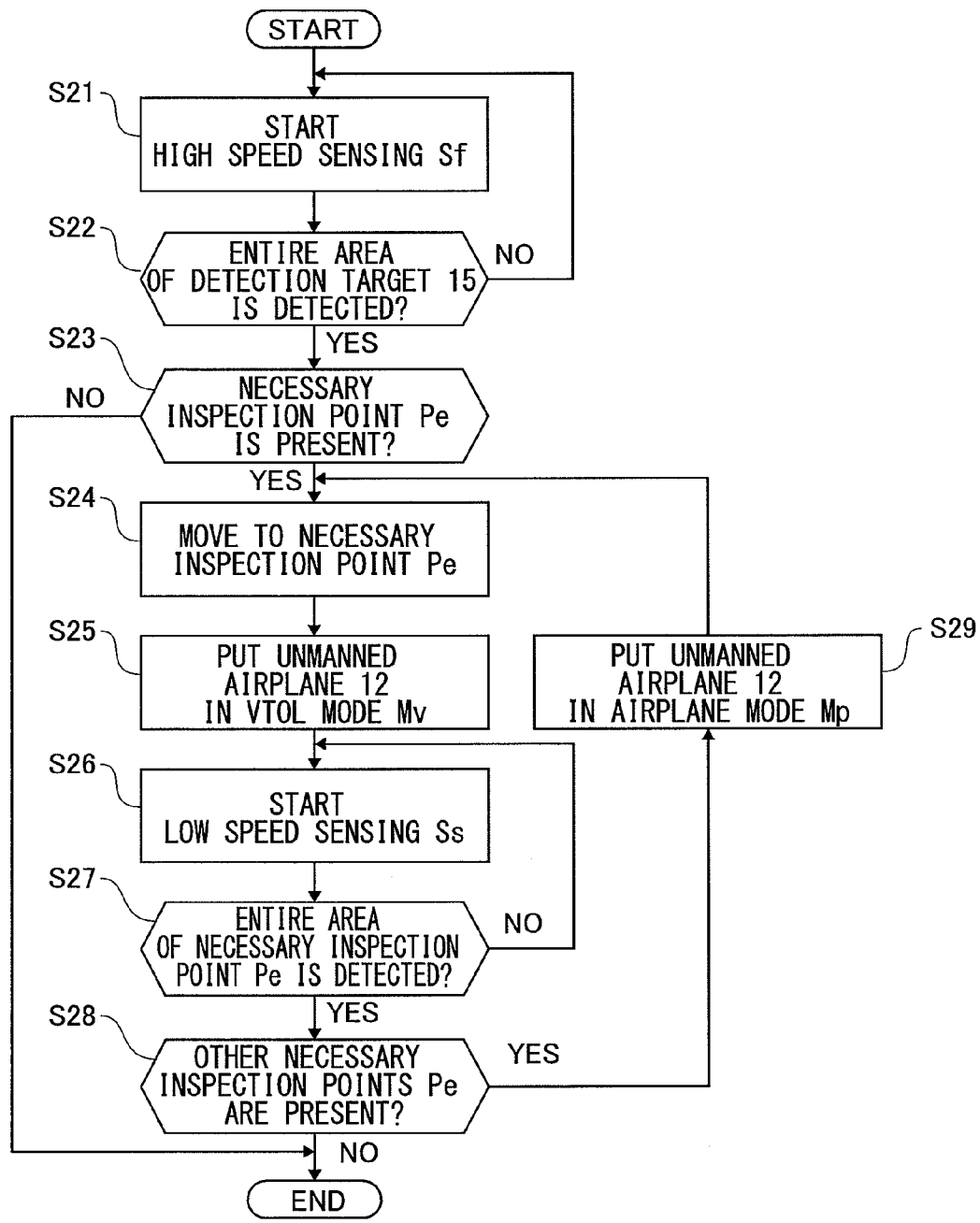
FIG. 6 is a flowchart showing an example of sensing processing in the in-flight detection processing executed by the integrated control unit.
Figure 7:
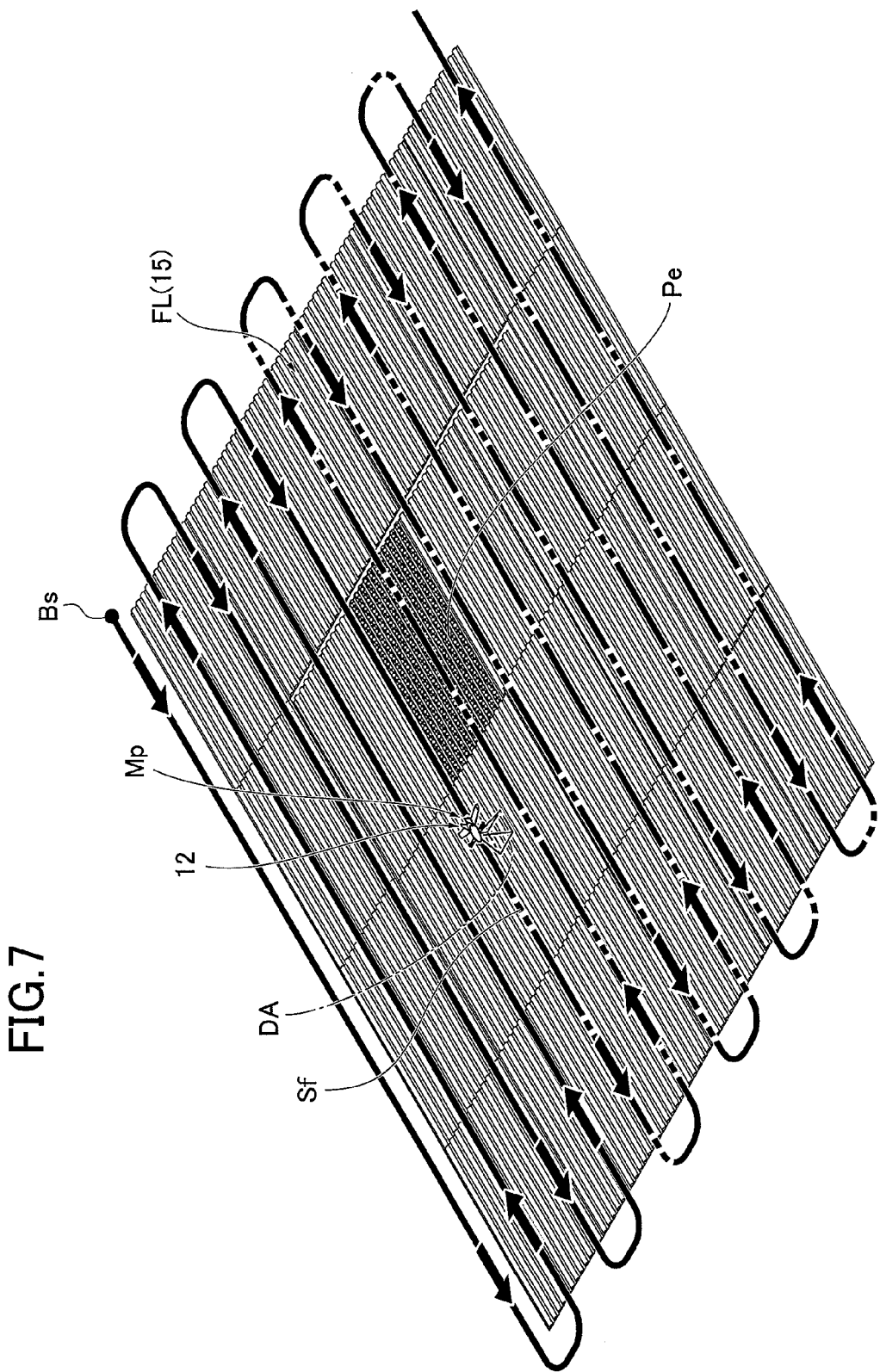
FIG. 7 is an explanatory view illustrating how the unmanned airplane in the airplane mode performs high speed sensing over a farm land in the wide area sensor system.
Figure 8:
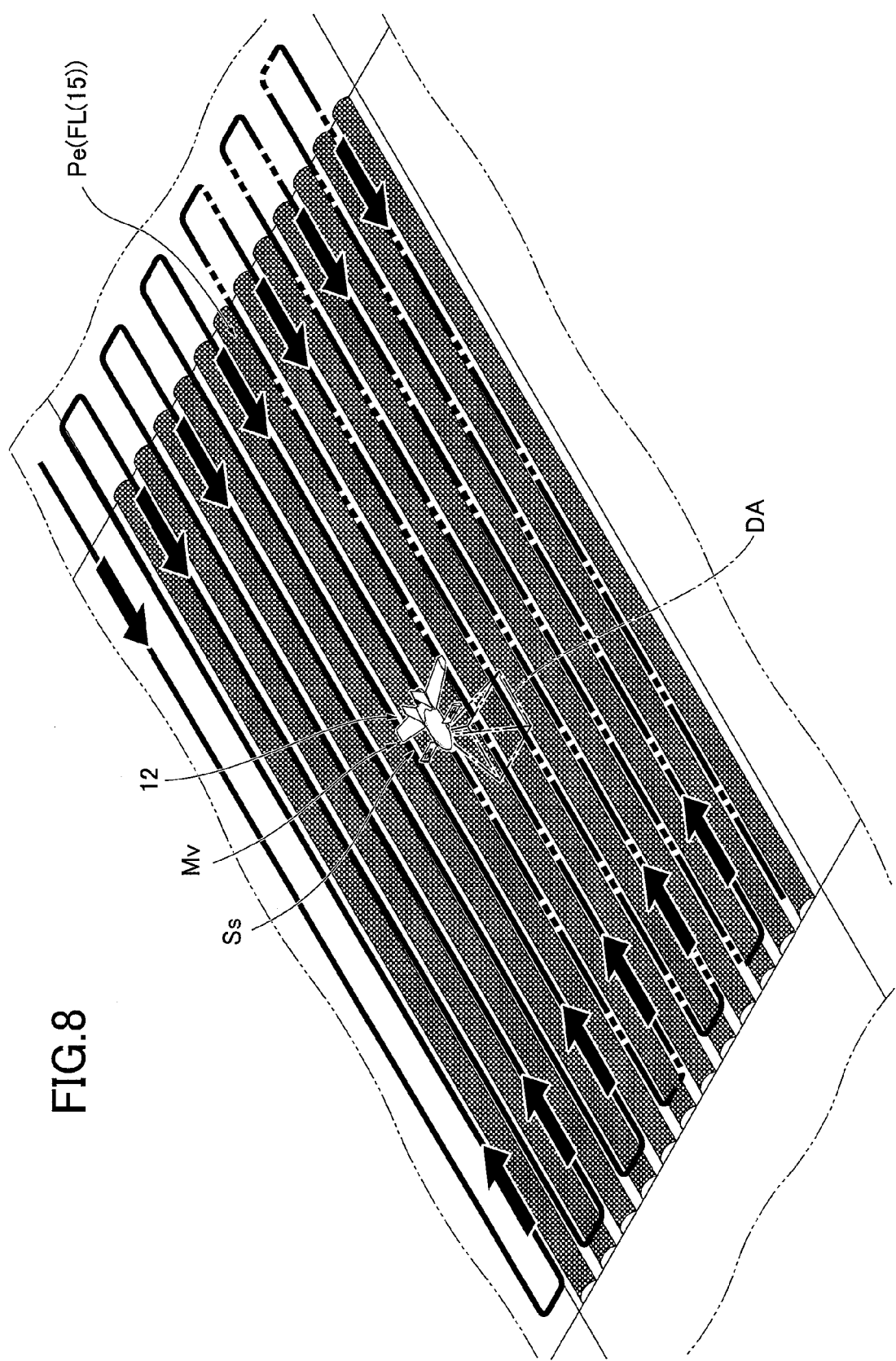
FIG. 8 is an explanatory view illustrating how the unmanned airplane in the VTOL mode performs low speed sensing on a necessary inspection point in the farm land in the wide area sensor system.

First, the schematic structure of a wide area sensor system 10 according to a first embodiment of the wide area sensor system of the present invention will be described with reference to FIGS. 1 to 8. The wide area sensor system 10 performs an in-flight detection method as an embodiment of the wide area sensor system of the present invention and includes a program as an embodiment of the program according to the present invention. FIG. 7 schematically shows an example of how high speed sensing Sf is performed over a farm land FL, and FIG. 8 schematically shows an example of how low speed sensing Ss is performed on the farm land FL. Note that these examples do not necessarily comply with actual aspects.

Figure 1:
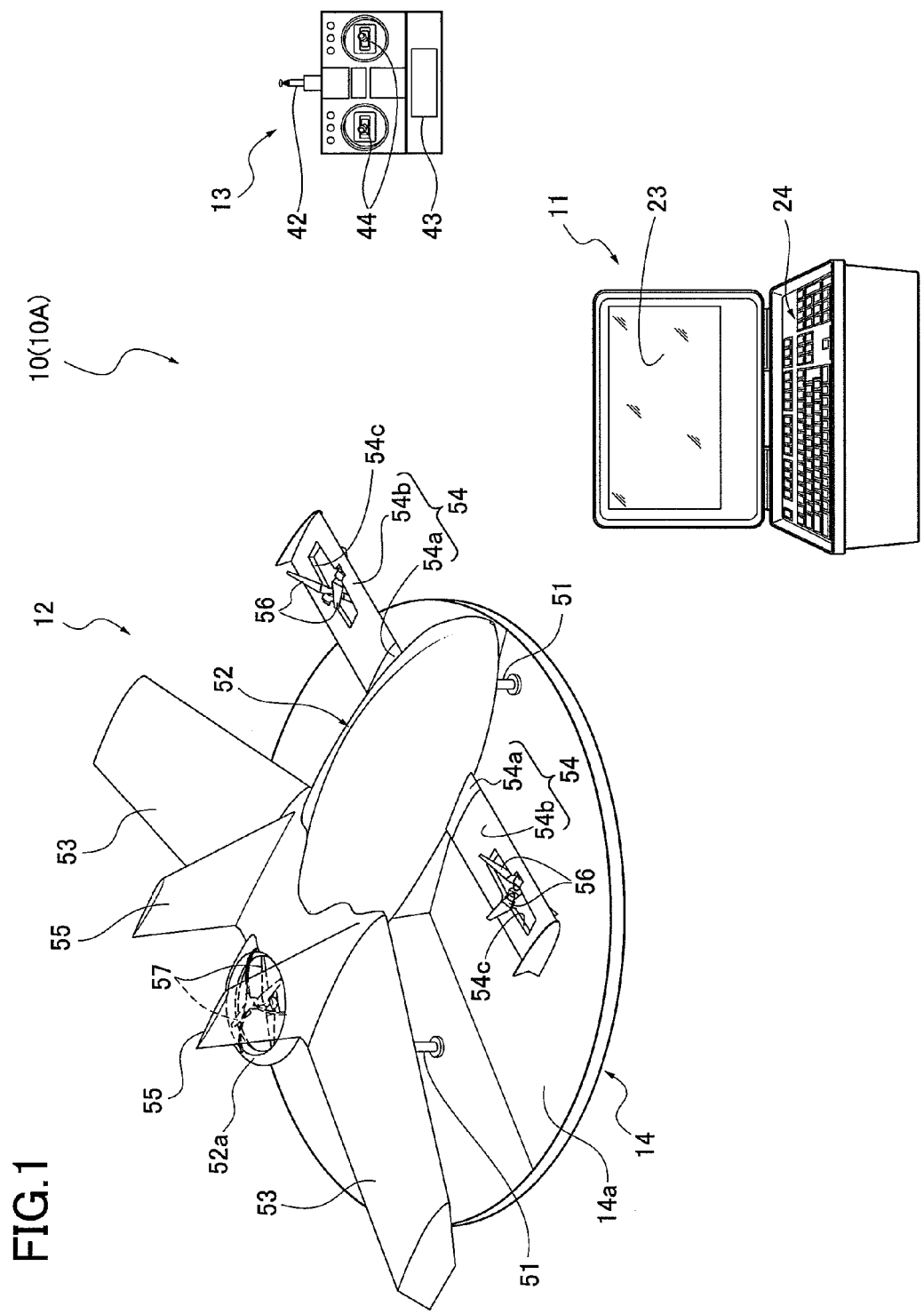
FIG. 1 is a perspective view schematically showing a structure of a wide area sensor system according to a first embodiment as an example of a wide area sensor system.

The wide area sensor system 10 according to the first embodiment of the present invention includes, an external control apparatus 11, an unmanned airplane 12, a remote controller 13, and a dock 14, as shown in FIG. 1. The wide area sensor system 10 detects the state of a detection target 15 (see FIG. 7 and so on) ranging widely by flying the unmanned airplane 12 while driving a state detection sensor 34 installed in the unmanned airplane 12 and performing sensing under the control of the external control apparatus 11.

Figure 2:
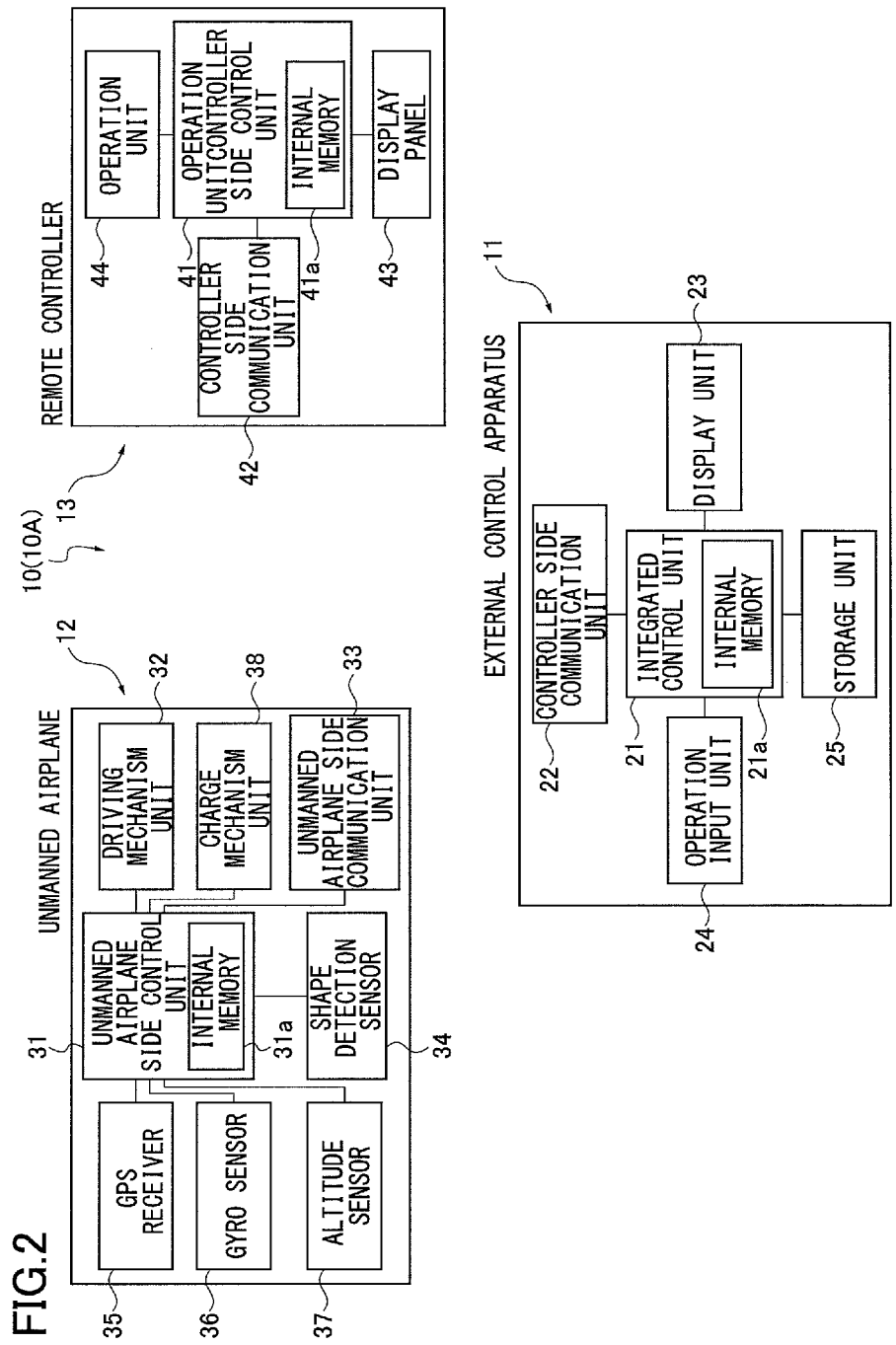
FIG. 2 is a block diagram for explaining function of the wide area sensor system 10.

The external control apparatus 11 controls the operation of the unmanned airplane 12 based on a preset flight program or an actuation performed on the remote controller 13. In addition, the external control apparatus 11 stores a detection result (data thereof) transmitted from the unmanned airplane 12 (the state detection sensor 34 thereof) in a storage unit 25 as appropriate and analyzes the detection result. In the first embodiment, the external control apparatus 11 extracts a necessary inspection point Pe (see FIG. 7 and so on) in the detection target 15 based on the analysis (detection result). As illustrated in FIG. 2, the external control apparatus 11 includes an integrated control unit 21, a control side communication unit 22, a display unit 23, an operation input unit 24, and the storage unit 25. In the first embodiment, the external control apparatus 11 is formed as a Personal Computer (PC), accommodated in a housing that stores a program in the storage unit 25 (non-transitory computer readable medium). It is noted that the program may be stored in an internal memory 21a (non-transitory computer readable medium) of the integrated control unit 21.

The integrated control unit 21 executes the following processes using the program stored in the storage unit 25 or the built-in internal memory 21a in a centralized manner. The processes include setting processing and driving processing based on an operation performed on the operation input unit 24 and a communication processing between the control side communication unit 22 and an unmanned airplane side communication unit 33 of the unmanned airplane 12 and between the control side communication unit 22 and a controller side communication unit 42 of the remote controller 13. In addition, the processes include processing for storing a detection result (data thereof) transmitted from the unmanned airplane 12 (the state detection sensor 34 thereof, which will be described later) in the storage unit 25 and processing for extracting the necessary inspection point Pe (see FIG. 7 and so on) in the detection target 15 based on the detection result. In addition, the processes include driving control processing for the display unit 23, in-flight detection processing (see the flowchart in FIG. 5) for the unmanned airplane 12, and sensing processing (see the flowchart in FIGS. 6 and 9) for the unmanned airplane 12 (the state detection sensor 34 thereof). Further, the subsequent processes include information obtainment processing for obtaining information by analyzing the detection result and information output processing for outputting the detection result to an external device for analysis using the detection result. The integrated control unit 21 executes the above operation (control) based on an operation performed on the operation input unit 24 or according to a program stored in the storage unit 25 (the internal memory 21a).

The control side communication unit 22 enables various types of signals (data thereof) to be communicated via the unmanned airplane side communication unit 33 or the controller side communication unit 42 among the integrated control unit 21, an unmanned airplane side control unit 31 of the unmanned airplane 12, and a controller side control unit 41 of the remote controller 13. The various types of signals include signals of operation (control) according to a program, signals based on operations performed on the operation input unit 24 or the remote controller 13 (an operation unit 44 thereof), and signals indicating detection results in the state detection sensor 34.

The display unit 23 includes a liquid crystal display and, under the control of the integrated control unit 21, displays a flight plan of the unmanned airplane 12, aspects of sensing by the unmanned airplane 12, the detection result of the state detection sensor 34, and so on. The aspects of sensing include the high speed sensing Sf (see FIGS. 7 and 10) and the low speed sensing Ss (see FIGS. 8 and 11).

The operation input unit 24 operates various actions taken by the external control apparatus 11 and the unmanned airplane 12 and performs the setting of a flight plan (inputting numerical values for a flight plan) for the unmanned airplane 12, the setting of the aspect of the unmanned airplane 12 (inputting numerical values for sensing), and the setting of the external control apparatus 11. This operation input unit 24 in the first embodiment includes a keyboard and a pointing device such as a mouse that are connected to a PC. The operation input unit 24 may include the display unit 23 having the function of a touch panel.

The storage unit 25 can store various types of data and programs and enables them to be read under the control of the integrated control unit 21. This storage unit 25 in the first embodiment stores (saves) a program for configuring the wide area sensor system 10 by combining the external control apparatus 11 with the unmanned airplane 12 and the remote controller 13 and stores (saves) a detection result output from the unmanned airplane 12. The unmanned airplane 12 flies under the control of this external control apparatus 11.

The unmanned airplane 12 includes the unmanned airplane side control unit 31, a driving mechanism unit 32, the unmanned airplane side communication unit 33, the state detection sensor 34, a GPS receiver 35, a gyro sensor 36, an altitude sensor 37, and a charge mechanism unit 38. The driving mechanism unit 32 is driven to fly the unmanned airplane 12 and includes both movable front wings 54, first propellers 56, and second propellers 57.

The unmanned airplane side control unit 31 flies the unmanned airplane 12 by driving the driving mechanism unit 32 as appropriate while using detection results from the GPS receiver 35, the gyro sensor 36, and the altitude sensor 37. In addition, the unmanned airplane side control unit 31 executes communication processing in the unmanned airplane side communication unit 33 using a program stored in an incorporated internal memory 31a and executes driving processing of the driving mechanism unit 32 and the state detection sensor 34 based on a control signal from the integrated control unit 21 in a centralized manner.

The unmanned airplane side communication unit 33 enables communication of various types of signals (data thereof) with the integrated control unit 21 of the external control apparatus 11 via the control side communication unit 22 or with the controller side control unit 41 via the controller side communication unit 42 of the remote controller 13. The various types of signals include signals of operation (control) according to a program from the external control apparatus 11, signals based on operations executed by the operation input unit 24 or the remote controller 13 (the operation unit 44 thereof), or signals indicating detection results in the state detection sensor 34.

The state detection sensor 34 detects the states of the detection target 15. The detection target 15 is, for example, a farm land (agricultural field) (see reference symbol FL in FIG. 7 and so on), paddy field, forest, pipeline (see reference symbol PL in FIG. 10 and so on), electric feeder line, improved land, construction field, road, mining, power plant, digging, ruin, coastline, volcano, devastated district, and so on. The states of the detection target 15 is, for example, a shape, temperature, type of a crop (plant) grown, content of raising elements such as nutrients of plant (crop), soil type, amount of water included, degree of pollution, and so on. The state detection sensor 34 for detecting such states of the detection target 15 is, for example, a noncontact type temperature sensor, hyper-spectrum camera, wavelength sensor, imaging device, laser scanning device, or the like. The noncontact type temperature sensor is, for example, a radiation thermometer that measures the intensity (amount of energy) of an infrared ray radiated from an object using an infrared sensor and converts the measured value into a temperature by correcting the measured value based on the reference temperature and radiation ratio.

The hyper-spectrum camera, for example, obtains an image having a wavelength band from near-ultraviolet (for example, 350 nm) to near-infrared (for example, 1100 nm) and spectrally separates the wavelength of the image at predetermined intervals (for example, 5 nm) using a diffraction grating or the like to obtain hyper spectrum information. This hyper spectrum information is analyzed to obtain, for example, the shape, type of a plant, distribution of nutrients, amount of water, type of a soil, and so on. When using the hyper-spectrum camera, since the amount of hyper spectrum information is enormous and can be used for various purposes depending on the analysis, the hyper spectrum information is preferably output to the external control apparatus 11 (the integrated control unit 21) as the detection result from the state detection sensor 34.

An example of the wavelength sensor irradiates the detection target 15 with measurement light in a particular wavelength band or measurement light in all wavelength bands from the photoemitter and uses the photoreceptor to receive the reflected light with the particular wavelength band from the detection target 15. This wavelength sensor can obtain the amount and reflectivity of the reflected light in the particular wavelength band from the detection target 15. The amount and reflectivity of the reflected light in the particular wavelength band may be used for the estimation of the content of the raising element (such as the nutrient) corresponding to the particular wavelength band in the detection target 15 and for the calculation of the normalized difference vegetation index (NDVI) indicating the raising state (amount of the nutrient included therein) of the detection target 15. As for the relationship between the particular wavelength band and the raising element, the nitrogen (the raising element) is estimated based on the two wavelength bands 735 nm and 808 nm, for example. The protein (the raising element) is estimated based on the three wavelength bands 480 nm, 700 nm, and 1050 nm, for example. Water related to the estimation of protein is estimated based on one wavelength band 950 nm. The normalized difference vegetation index (NDVI) can be obtained based on (NDVI= (IR−R)/(IR+R)) using, as the measurement light, light in the red wavelength band and light in the infrared wavelength band where R is the reflectivity of the measurement light in the red wavelength band and IR is the reflectivity of the measurement light in the infrared wavelength band. In addition, to increase the significant display number of digits of the normalized difference vegetation index (NDVI), the normalized difference vegetation index (NDVI) may be multiplied by 100 to obtain the growth index (GI) (GI=NDVI×100)).

An example of the imaging device is a general still camera, a video camera having a video recording function, a stereoscopic camera capable of obtaining a three-dimensional image using parallax, or a 360 degree camera capable of obtaining 360 degree video. An example of the laser scanning device irradiates one point on the detection target 15 with laser light and measures the angle of irradiation and the duration time (flight time) for the laser light to be returned as the reflected light. Since this laser scanning device can obtain the three-dimensional coordinates at that point based on the angle of irradiation and the flight time of the laser light, the three-dimensional shape of the detection target 15 can be obtained by scanning on the detection target 15 while moving the position of point irradiation.

The state detection sensor 34 configured in this way may be formed as one or a plurality of the above sensors or other sensors. Although not shown in the drawing, the state detection sensor 34 is provided in a main body 52 (see FIG. 3 and so on) of the unmanned airplane 12 and forms a detection area (see reference symbol DA in FIGS. 7, 8, and so on) in the detection target 15 present below the main body 52. When the plural sensors are used together, a single duplicate detection area (see reference symbol DA in FIGS. 7, 8, and so on) may be formed or a separate detection area may be formed for each of the sensors so as to be superimposed during analysis. The detection results from such state detection sensors 34 are used together with the position measurement result from the GPS receiver 35.

The GPS receiver 35 is used to perform position measurement, for example, in the real-time kinematic (RTK) method using GNSS and, in the first embodiment, four GPS satellites are used to use GPS as one of GNSS. The GPS receiver 35 receives radio waves from the GPS satellites and extracts the data (position measurement data) necessary for position measurement transmitted with the radio wave. Although there are various methods in position measurement using position measurement data, the methods are not described in detail because they are known conventionally. Position measurement using position measurement data is performed basically by the unmanned airplane side control unit 31, but the measurement may be performed by the integrated control unit 21 of the external control apparatus 11 or an external device for more accurate position measurement. The position measurement (data thereof) is used to determine the coordinate position in which the unmanned airplane 12 flies or to add the coordinate position (data thereof) to the detection result from the state detection sensor 34. Although the GPS receiver 35 performs position measurement using the RTK method in the unmanned airplane 12 in the first embodiment, it is sufficient to ensure the accuracy for enabling the flight of the unmanned airplane 12 as a GPS receiver used for an air control circuit and the structure is not limited to that in the first embodiment. In this case, when the accuracy of the coordinate position (data thereof) of a detection results from the state detection sensor 34 is improved, it is preferable to provide a GPS receiver that enables position measurement at extremely high accuracy as the GPS receiver 35 in the first embodiment separately from the GPS receiver used for air control circuit.

The gyro sensor 36 detects rotary motion generated on the unmanned airplane 12 and outputs the detected rotary motion to the unmanned airplane side control unit 31. The gyro sensor 36 is used by the unmanned airplane side control unit 31 to determine the flight attitude or the like of the unmanned airplane 12. The altitude sensor 37 detects the flight altitude (location) of the unmanned airplane 12 and outputs the detected altitude to the unmanned airplane side control unit 31. The altitude sensor 37 is used by the unmanned airplane side control unit 31 to determine the flight altitude of the unmanned airplane 12. As described above, the unmanned airplane side control unit 31, the GPS receiver 35, the gyro sensor 36, and the altitude sensor 37 constitute the air control circuit that drives the driving mechanism unit 32 to control the flight route and attitude of the unmanned airplane 12 while flying the unmanned airplane 12. The unmanned airplane 12 may use an acceleration sensor together as the air control circuit. Since the unmanned airplane 12 according to the first embodiment includes the two air control circuits described above, safe flight is ensured if a trouble occurs in one of them.

The charge mechanism unit 38 obtains and stores the electric power for operating the components of the unmanned airplane 12. In the first embodiment, this charge mechanism unit 38 obtains electric power supplied from the dock 14 when the unmanned airplane 12 stays on the dock 14 (see FIG. 1). The charge mechanism unit 38 may obtain electric power from a power point (socket) of a building, an electric generator, or another place as long as the charge mechanism unit 38 obtains and stores electric power for operating the components of the unmanned airplane 12, and its structure is not limited to that in the first embodiment.

The wide area sensor system 10 can obtain the state of the detection target 15 based on detection results at individual coordinate positions by combining the detection result from the state detection sensor 34 with the position measurement result from the GPS receiver 35. For example, if a 360 degree camera and a laser scanning device are used as the state detection sensor 34, it is possible to obtain an image including information of a three-dimensional shape indicated by a three-dimensional coordinate position at extremely high accuracy by combining the detection results while matching the image of the 360 degree camera with the data of a point set by the laser scanning device. In the first embodiment, a wavelength sensor is used as the state detection sensor 34 and, when the unmanned airplane 12 flies in the airplane mode Mp or the VTOL mode Mv, the detection area DA (see FIGS. 7 and 8 and so on) for obtaining reflected light in a particular wavelength band is formed below the unmanned airplane 12 (the main body 52). Accordingly, the unmanned airplane 12 can obtain the amount and reflectivity of reflected light in a particular wavelength band from the detection target 15 using the state detection sensor 34 by flying above the detection target 15.

The remote controller 13 is a portable operation unit that can be carried and is used to operate the unmanned airplane 12. This remote controller 13 includes the controller side control unit 41, the controller side communication unit 42, a display panel 43, and the operation unit 44. The controller side control unit 41 executes communication processing in the controller side communication unit 42 according to a program stored in an internal memory 41a included therein and executes the drive processing of the display panel 43 in a centralized manner. The controller side communication unit 42 enables the transmission of an operation (the signal thereof) performed on the operation unit 44 toward the integrated control unit 21 of the external control apparatus 11 via the control side communication unit 22 or toward the unmanned airplane side control unit 31 of the unmanned airplane 12 via the unmanned airplane side communication unit 33. The operation unit 44 is operated to operate the unmanned airplane 12. The display panel 43 includes a liquid crystal display and displays various settings made by the operation input unit 24 or the operation unit 44, the mode of the unmanned airplane 12, and so on under the control of the controller side control unit 41.

The dock 14 is a place at which the unmanned airplane 12 stops as shown in FIG. 1. In the first embodiment, the dock 14 can supply electric power to the unmanned airplane 12 (the charge mechanism unit 38 thereof) that stops. The dock 14, which is disc-shaped, has an upper surface 14a on which feet 51 of the unmanned airplane 12 are disposed. Electric power is supplied to the charge mechanism unit 38 of the unmanned airplane 12 through the feet 51. The feet 51 are provided on the main body 52 and both main wings 53 of the unmanned airplane 12 and can be ejected downward (see FIG. 1) and can be accommodated in the main body 52 and both the main wings 53 (see FIGS. 3 and 4).

Figure 3:
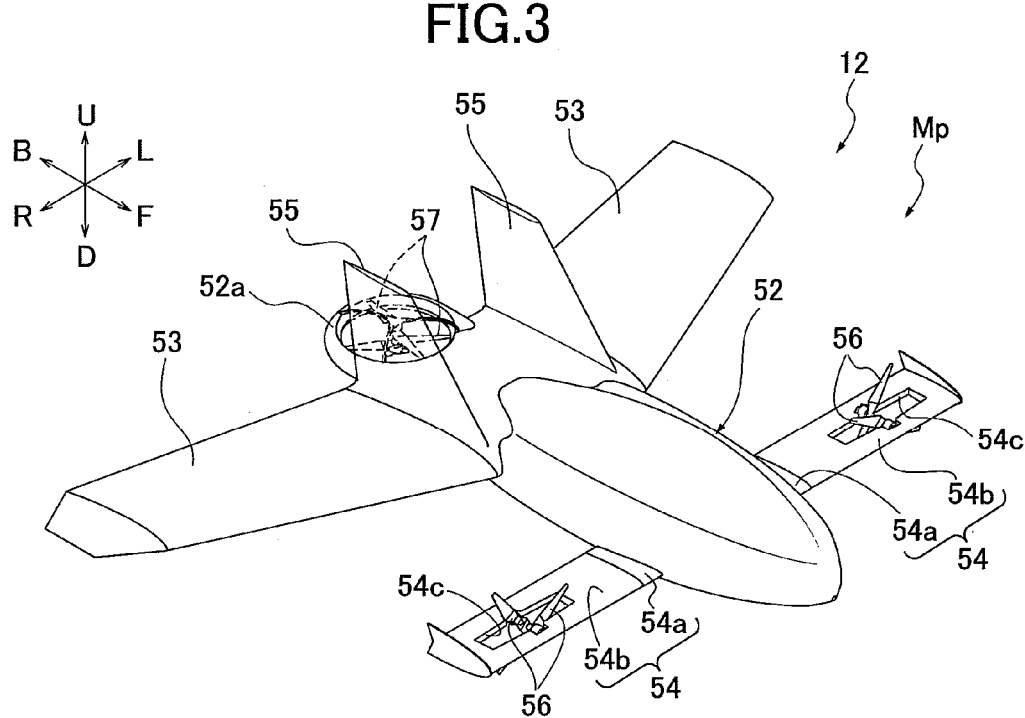
FIG. 3 is an explanatory view for explaining an unmanned airplane in the wide area sensor system put in an airplane mode.
Figure 4:
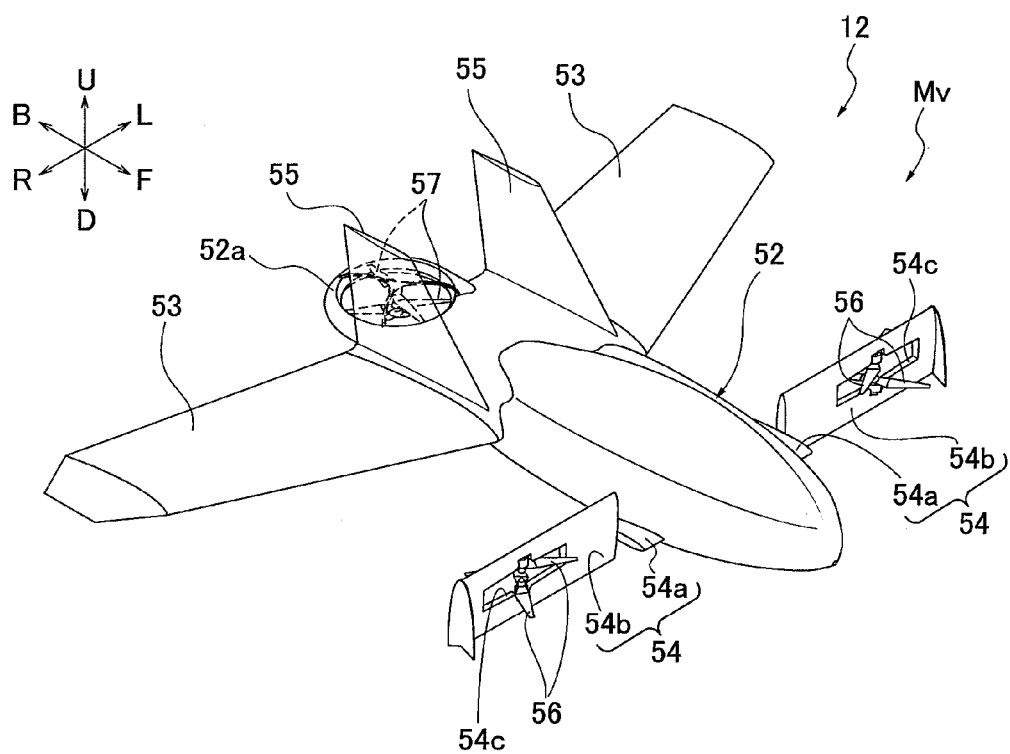
FIG. 4 is an explanatory view, similar to FIG. 3, for explaining the unmanned airplane 12 put in a VTOL mode.

Next, the outer structure of the unmanned airplane 12 will be described with reference to FIGS. 3 and 4. In the following description, as shown in FIGS. 3 and 4, it is assumed that the vertical direction when the unmanned airplane 12 is disposed on a horizontal surface is the up-down direction (see arrows U and D (arrow U is oriented upward)). It is also assumed that, in the following description, in the unmanned airplane 12 in that state, the direction along the horizontal surface in which the main body 52 extends is the front-rear direction (see arrows F and B (arrow F is oriented forward)) and the direction orthogonal to the up-down direction and the front-rear direction is the left-right direction (see arrows L and R (arrow R is oriented rightward)).

The main body 52 of the unmanned airplane 12 has the pair of main wings 53, the pair of movable front wings 54, and a pair of vertical tails 55. The main body 52 accommodates the unmanned airplane side control unit 31, the unmanned airplane side communication unit 33, the state detection sensor 34, the GPS receiver 35, the gyro sensor 36, the altitude sensor 37, and the charge mechanism unit 38 (see FIG. 2) and has a streamline extending in the front-rear direction. At the rear end of the main body 52, the second propellers 57 are provided.

The main wings 53 produce a main lift force for the unmanned airplane 12 and are disposed in the vicinity of the rear end of the main body 52 as a pair. Both the main wings 53 project obliquely backward in the left-right direction from both sides of the main body 52 and the cross sections orthogonal to the left-right direction are like streamline thin plates. Both the main wings 53 have a width in the front-rear direction gradually reducing toward their ends (projection ends) and the projection end portions are returned obliquely downward.

The movable front wings 54 are provided in the vicinity of the front end of the main body 52 as a pair in front of both the main wings 53. Both the movable front wings 54 project in the left-right direction from both sides of the main body 52 and the cross sections orthogonal to the left-right direction are like streamline thin plates. Both the movable front wings 54 each include a fixed wing part 54a fixed to the main body 52 and a rotary wing part 54b disposed rotatably about a rotary shaft extending in the horizontal direction from the fixed wing part 54a. In both the movable front wings 54, by turning the rotary wing parts 54b relative to the fixed wing parts 54a, the rotary wing parts 54b can be laid down (see FIG. 3) and the rotary wing parts 54b can be stood up (see FIG. 4). When the rotary wing parts 54b of both the movable front wings 54 are laid down, integral thin plates are formed from the fixed wing parts 54a to the rotary wing parts 54b and a single wing (horizontal wind) is formed as a whole (see FIG. 3). The first propellers 56 are provided in each of the rotary wing parts 54b.

The vertical tails 55 are provided in the vicinity of the rear end of the main body 52 as a pair in the positions substantially the same as those of the main wings 53 in the front-rear direction. Both the vertical tails 55 project obliquely backward in the up-down direction from the vicinity of both sides of the main body 52 and the cross sections orthogonal to the up-down direction are like streamline thin plates.

When the rotary wing parts 54b of both the movable front wings 54 are laid down to form an integral thin plate from the fixed wing parts 54a to the rotary wing parts 54b in the unmanned airplane 12 (see FIG. 3), both the movable front wings 54, both the main wings 53, and both the vertical tails 55 form wings to enable gliding. The unmanned airplane 12 has the first propellers 56 and the second propellers 57 as the driving mechanism unit 32 for obtaining a thrust force.

The first propellers 56 are provided in the rotary wing part 54b of each of the movable front wings 54 as a pair in the front-rear direction. That is, the two first propellers 56 are provided for each of the movable front wings 54 (the rotary wing parts 54b thereof) and a total of four first propellers 56 are provided in the unmanned airplane 12. Each of the first propellers 56 is provided in a mount opening 54c of the rotary wing part 54b of each of the movable front wings 54. The mount opening 54c is provided so as to pass through the rotary wing part 54b in the up-down direction to form a rectangle in a state in which the rotary wing part 54b is laid down. The first propellers 56 are provided in the mount openings 54c rotatably about the rotary shaft extending in the front-rear direction in a state in which the rotary wing parts 54b are laid down. The first propellers 56 are provided in the same mount opening 54c as a pair in the front-rear direction and rotate in mutually opposite directions to cancel torques (forces rotating the main body 52 (the unmanned airplane 12)) each other produced by rotation.

When the rotary wing parts 54b are laid down, the first propellers 56 rotate about the rotary shaft extending in the front-rear direction to produce a thrust force in the front-rear direction (horizontal direction) (see FIG. 3). When the rotary wing parts 54b are stood up, the first propellers 56 rotate about the rotary shaft extending in the up-down direction to produce a thrust force mainly in the up-down direction (see FIG. 4). When the rotary wing parts 54b stood up are inclined forward, the rotary shaft oriented in the vertical direction is inclined forward, the first propellers 56 rotate about the rotary shaft to produce a thrust force to the front side in the front-rear direction in addition to the thrust force in the up-down direction. Similarly, when the rotary wing parts 54b stood up are inclined backward, the rotary shaft oriented in the up-down direction is inclined backward, the first propellers 56 rotate about the rotary shaft to produce a thrust force to the rear side in the front-rear direction in addition to the thrust force in the up-down direction.

The second propellers 57 are provided as a pair in the up-down direction in a circular mount opening 52a provided at the rear end of the main body 52. The circular mount opening 52a is like a circle about the center axis line extending in the up-down direction and is provided so as to project backward from the rear end of the main body 52. The second propellers 57 are provided in the circular mount opening 52a and rotate in mutually opposite directions about the rotary shaft extending in the up-down direction to cancel torques produced by rotation. The second propellers 57 produce a thrust force in the up-down direction by rotating about the rotary shaft extending in the up-down direction.

In the unmanned airplane 12, seen in the up-down direction, the center positions of both the first propellers 56 of one of the movable front wings 54 (rotary wing parts 54b), both the first propellers 56 of the other of the movable front wings 54 (rotary wing parts 54b), and both the second propellers 57 are disposed in the vertices of a substantially regular triangle. In the unmanned airplane 12 as configured above, gliding is enabled when the rotary wing parts 54b are laid down as shown in FIG. 3 and a thrust force in the front-rear direction can be produced by the first propellers 56, enabling flight as a propeller airplane. In a state in which the rotary wing parts 54b are laid down (referred to as the airplane mode Mp), the unmanned airplane 12 can fly efficiently at high speed.

When the rotary wing parts 54b are stood up in the unmanned airplane 12 as shown in FIG. 4, the first propellers 56 can produce a thrust force in the up-down direction, enabling elevating, lowering, and hovering in cooperation with the second propellers 57. When the rotary wing parts 54b stood up are inclined in the front-rear direction in the unmanned airplane 12, the first propellers 56 can produce a thrust force in the up-down direction and the front-rear direction. Accordingly, when the rotary wing parts 54b are stood up (referred to as a VTOL (Vertical Taking Off and Landing) mode Mv), the unmanned airplane 12 can perform vertical taking off and landing, hovering, and stable and low-speed flight like a helicopter. In the VTOL mode Mv, the first propellers 56 and the second propellers 57 function as rotors. Accordingly, in the unmanned airplane 12, the first propellers 56 function as propulsive units that can change their attitudes (output direction) relative to the main body 52. In addition, in the unmanned airplane 12, the movable front wings 54 in which the first propellers 56 are disposed function as movable wings provided on the main body 52 so as to change their attitudes.

In addition, the unmanned airplane 12 can define the detection area DA (see FIGS. 7 and 8 and so on) therebelow during flight using the state detection sensor 34 (see FIG. 2) provided on the main body 52 regardless of whether the unmanned airplane 12 is put in the airplane mode Mp or the VTOL mode Mv. Accordingly, the unmanned airplane 12 can detect the state of the detection target 15 in either mode by flying above the detection target 15. In the following description, the detection of the state of the detection target 15 in the airplane mode Mp by the state detection sensor 34 is referred to as the high speed sensing Sf and the detection of the state of the detection target 15 in the VTOL mode Mv by the state detection sensor 34 is referred to as the low speed sensing Ss. If the state detection sensor 34 performs detection at constant time-intervals in the unmanned airplane 12, the intervals (resolution) of detection positions (i.e., distances between the detection positions) in the detection target 15 depend on the flight speed. Accordingly, the low speed sensing Ss corresponding to flight in the VTOL mode Mv can detect the state at shorter intervals than the high speed sensing Sf corresponding to flight in the airplane mode Mp, thereby enabling detection of the state of the detection target 15 more accurately.

Next, in-flight detection processing will be described with reference to FIG. 5. The in-flight detection processing detects the state of the detection target 15 using the unmanned airplane 12 under the control of the integrated control unit 21 of the external control apparatus 11 in the wide area sensor system 10. FIG. 5 is a flowchart showing the in-flight detection processing (in-flight detection method) performed by the integrated control unit 21 in the first embodiment. The in-flight detection processing is executed by the integrated control unit 21 based on a program stored in the internal memory 21a of the integrated control unit 21 or the storage unit 25. The flowchart in FIG. 5 is started by turning on the power of the wide area sensor system 10 (that is, the external control apparatus 11, the unmanned airplane 12, and the remote controller 13). When the remote controller 13 is not used, there is no need to turn on the power of the remote controller 13.

In step S1, a flight plan is obtained, and the processing proceeds to step S2. In step S1, the flight plan of the unmanned airplane 12 set by considering the position (place), shape, and the like of the detection target 15 to be detected is obtained. This flight plan indicates information such as a flight route in which the unmanned airplane 12 takes off the dock 14, reaches the detection target 15, performs sensing processing described later on the detection target 15, and then returns to and lands on the dock 14. The flight plan may be stored in the internal memory 21a or the storage unit 25 in advance, may be set by the operation input unit 24 or the remote controller 13 (an operation unit 44 thereof), or may be obtained from an external device. In an example of sensing processing in this flight plan, the state of the entire area of the detection target 15 is detected and the state of the necessary inspection point Pe (see FIG. 7 and so on) extracted from the detection result is detected accurately. In another example of sensing processing in this flight plan, the necessary reconnaissance point Ps (see FIG. 10 and so on of the second embodiment) in the detection target 15 is preset, the state of the detection target 15 is detected in the route leading to the necessary reconnaissance point Ps, and the state of the necessary reconnaissance point Ps is detected accurately when the necessary reconnaissance point Ps is reached. In the latter case, the state of the detection target 15 at a point more distant than the necessary reconnaissance point Ps may be detected together regardless of the time order of the accurate detection of the state of the necessary reconnaissance point Ps in the sensing processing of the flight plan. In either case, in the flight plan, in the sensing processing, a flight route is set by considering the shape, size, and so on of the detection target 15 and the detection area DA so that the detection area DA is moved to efficiently detect the entire area of the detection target 15. The flight plan is not limited to the above example as long as it detects the state of the detection target 15.

In step S2, the unmanned airplane 12 is put in the VTOL mode Mv (that is, the rotary wing parts 54b of both the movable front wings 54 are stood up) to fly the unmanned airplane 12 according to the obtained flight plan.

In step S3, following step S2 in which the unmanned airplane 12 is put in the VTOL mode Mv, the unmanned airplane 12 is taken off, and the processing proceeds to step S4. In step S3, the first propellers 56 and the second propellers 57 of the unmanned airplane 12 in the VTOL mode My are driven as appropriate to elevate the unmanned airplane 12.

In step S4, the unmanned airplane 12 having taken off is put in the airplane mode Mp (that is, the rotary wing parts 54b of both the movable front wings 54 are laid down) to fly it to the detection target 15. At this time, the first propellers 56 and the second propellers 57 are driven as appropriate so that the unmanned airplane 12 hovers in the air.

In step S5, following step S4 in which the unmanned airplane 12 is put in the airplane mode Mp or step S6 in which the unmanned airplane 12 is determined not to reach the point, the unmanned airplane 12 starts or continues flight toward the detection target 15, and the processing proceeds to step S6. In step S5, the driving of the first propellers 56 is mainly adjusted and the unmanned airplane 12 in the airplane mode Mp is flown to the first arrival point in the detection target 15 in the flight plan.

In step S6, following step S5 in which the unmanned airplane 12 starts flight toward the detection target 15, a decision is made as to whether the unmanned airplane 12 has reached the point, and the processing proceeds to step S7 in the case of Yes or returns to step S5 in the case of No. In step S6, the decision is made as to whether the unmanned airplane 12 has reached the first arrival point in the detection target 15 in the flight plan and this decision is repeated while the unmanned airplane 12 continues flight until it reaches the first arrival point.

In step S7, following step S6 in which it is determined that the unmanned airplane 12 has reached the point, sensing processing is performed, and the processing proceeds to step S8. In step S7, sensing processing (see the flowchart in FIG. 6) including the high speed sensing Sf and the low speed sensing Ss according to the flight plan is performed. This sensing processing will be described in detail later.

In step S8, following step S7 in which sensing processing is performed, the unmanned airplane 12 is put in the airplane mode Mp, and the processing proceeds to step S9. In step S8, the unmanned airplane 12 having finished sensing processing is put in the airplane mode Mp (that is, the rotary wing parts 54b of both the movable front wings 54 are laid down) to fly it to the dock 14. At this time, the first propellers 56 and the second propellers 57 are driven as appropriate so that the unmanned airplane 12 hovers in the air. When the airplane mode Mp is already reached upon completion of sensing processing, the processing proceeds to step S9 by substantially skipping step S8.

In step S9, following step S8 in which the unmanned airplane 12 is put in the airplane mode Mp or step S10 in which the unmanned airplane 12 is determined not to have reached the point, the unmanned airplane 12 starts or continues flight toward the dock 14, and the processing proceeds to step S10. In step S9, the driving of the first propellers 56 is mainly adjusted and the unmanned airplane 12 in the airplane mode Mp is flown to the dock 14.

In step S10, following step S9 in which the unmanned airplane 12 starts flight toward the dock 14, a decision is made as to whether the unmanned airplane 12 has reached the point, and the processing proceeds to step S11 in the case of Yes or returns to step S9 in the case of No. In step S10, the decision is made as to whether the unmanned airplane 12 has reached the upward position above the dock 14 and this decision is repeated while the unmanned airplane 12 continues flight until it reaches the upward position.

In step S11, following step S10 in which it is determined that the unmanned airplane 12 has reached the point, the unmanned airplane 12 is put in the VTOL mode Mv, and the processing proceeds to step S12. In step S11, since the unmanned airplane 12 has reached the upward position above the dock 14, the unmanned airplane 12 is put in the VTOL mode Mv (that is, the rotary wing parts 54b of both the movable front wings 54 are stood up) so as to land on the dock 14. At this time, the first propellers 56 and the second propellers 57 are driven as appropriate so that the unmanned airplane 12 hovers in the air.

In step S12, following step S11 in which the unmanned airplane 12 is put in the VTOL mode Mv, the unmanned airplane 12 is landed and this in-flight detection processing ends. In step S12, the unmanned airplane 12 is lowered by appropriately driving the first propellers 56 and the second propellers 57 of the unmanned airplane 12 put in the VTOL mode Mv, the feet 51 are ejected, and the feet 51 are placed on the upper surface 14a so as to land the unmanned airplane 12 on the dock 14.

Next, the sensing processing (step S7) in the above in-flight detection processing (the in-flight detection method (the flowchart in FIG. 5)) will be described. This sensing processing detects the state of the detection target 15 by performing the high speed sensing Sf and the low speed sensing Ss on the detection target 15 as appropriate according to the flight plan. In the sensing processing according to the first embodiment, the high speed sensing Sf is first performed on the entire area of the detection target 15, the necessary inspection point Pe is extracted based on the result, and the state of the extracted necessary inspection point Pe is accurately detected by the low speed sensing Ss (see FIGS. 7 and 8 and so on). FIG. 6 is a flowchart showing the sensing processing executed by the integrated control unit 21 in the first embodiment. As described above, this sensing processing is started when the unmanned airplane 12 reaches the first arrival point in the detection target 15 in the flight plan. The first arrival point is set so that the high speed sensing Sf can be efficiently performed on the entire area of the detection target 15 while considering the positional relationship between the dock 14 and the detection target 15.

In step S21, the high speed sensing Sf is started, and the processing proceeds to step S22. Step S21 is the stage at which the unmanned airplane 12 flying in the airplane mode Mp reaches the first arrival point in the detection target 15 in the flight plan (the flowchart in FIG. 5). Accordingly, in step S21, the state detection sensor 34 is driven while flight in the airplane mode Mp continues, and the detection area DA is defined on the detection target 15 to start the high speed sensing Sf of the detection target 15 (see FIG. 7). In step S21, the unmanned airplane 12 flies according to a flight route set in the flight plan and the detection area DA is moved from the first arrival point in the detection target 15 to efficiently detect the entire area of the detection target 15. For example, when the detection area DA formed by the flying unmanned airplane 12 cannot cover the width dimension of the detection target 15, the unmanned airplane 12 covers the entire area by moving bidirectionally above the detection target 15, moving inward from outward while reducing the orbital radius, or moving outward from inward while increasing the orbital radius. Alternatively, for example, when the detection area DA formed by the flying unmanned airplane 12 can cover the width dimension of the detection target 15, the unmanned airplane 12 covers the entire area only by flying along the detection target 15. In step S21, the detection result of the high speed sensing Sf is obtained from the state detection sensor 34 via the unmanned airplane side communication unit 33 and the control side communication unit 22 and the detection result is analyzed sequentially.

In step S22, following step S21 in which the high speed sensing Sf is started, a decision is made as to whether the entire area of the detection target 15, and the processing proceeds to step S23 in the case of Yes or returns to step S21 in the case of No. In step S22, the decision is made as to whether the detection area DA has been defined over the entire area of the detection target 15 (that is, whether the state of the entire area of the detection target 15 has been detected by the high speed sensing Sf). In step S22, this decision is repeated while continuing the high speed sensing Sf until the detection area DA is defined over the entire area of the detection target 15 (the state of the entire area has been detected).

In step S23, following step S22 in which it is determined that the entire area of the detection target 15 has been detected, a decision is made as to whether the necessary inspection point Pe is present, and the processing proceeds to step S24 in the case of Yes or this sensing processing ends in the case of No. In step S23, based on the detection result (the analysis result thereof) in the high speed sensing Sf obtained by repeating step S21 and step S22, the decision is made as to whether the necessary inspection point Pe is present in the detection target 15. The necessary inspection point Pe is a point whose state needs to be detected accurately based on the detection result of the high speed sensing Sf. The necessary inspection point Pe is, for example, a point at which a temperature falling outside the temperature range assumed in the detection target 15 has been detected when a noncontact type temperature sensor is used as the detection sensor 34. Alternatively, the necessary inspection point Pe is, for example, a point at which the detected shape, plant type, nutrient distribution, amount of water, soil type, or the like is different from that assumed in the detection target 15 when a hyper spectrum camera is used as the detection sensor 34. Alternatively, the necessary inspection point Pe is, for example, a point at which the content of raising elements (such as nutrients), the normalized difference vegetation index (NDVI), and so on in plants as the detection target 15 fall outside the assumed range when a wavelength sensor is used as the state detection sensor 34. Alternatively, the necessary inspection point Pe is, for example, a point at which the shape or color of an obtained image is different from that of the previous detection target 15 or that of the assumed detection target 15 when an imaging device is used as the state detection sensor 34. Alternatively, the necessary inspection point Pe is, for example, a point at which the three-dimensional coordinates are different from those of the previous detection target 15 or those of the assumed detection target 15 when a laser scanning device is used as the state detection sensor 34. In step S23, when the necessary inspection point Pe is present in the detection target 15, the necessary inspection point Pe is extracted and information (such as the position, size, and shape) of the necessary inspection point Pe is stored in the internal memory 21a or the storage unit 25. In step S23, when a plurality of the necessary inspection points Pe are extracted in the detection target 15, the necessary inspection points Pe are given their ordinal ranks and the ordinal ranks are stored in the internal memory 21a or the storage unit 25 in addition to the information (such as the position, size, and shape) of the necessary inspection points Pe. In addition, in step S23, a flight plan for the low speed sensing Ss including a flight route considering the shapes, sizes, and so on of the necessary inspection points Pe and the detection area DA is generated so that the detection area DA is moved to efficiently detect the entire area of the necessary inspection points Pe.

In step S24, following step S23 in which it is determined that the necessary inspection point Pe is present or step S29 in which the unmanned airplane 12 is put in the airplane mode Mp, movement to the necessary inspection point Pe is performed, and the processing proceeds to step S25. Since step S24 is the state at which the high speed sensing Sf is basically completed, flight in the airplane mode Mp is continued and the unmanned airplane 12 moves toward the necessary inspection point Pe. At this time, since the high speed sensing Sf of the entire area of the detection target 15 is completed, the driving of the state detection sensor 34 can be stopped in the first embodiment. Nevertheless, when flying above the detection target 15, the high speed sensing Sf may be performed by driving the state detection sensor 34. In step S24, when returning from step S28, the above operation is performed on the necessary inspection point Pe having the number next to the number given to the necessary inspection point Pe for which the state has been detected before step S28.

In step S25, following step S24 in which movement to the necessary inspection point Pe is performed, the unmanned airplane 12 is put in the VTOL mode Mv, and the processing proceeds to step S26. In step S25, since the unmanned airplane 12 has moved to the necessary inspection point Pe to be detected, the unmanned airplane 12 is put in the VTOL mode Mv (that is, the rotary wing parts 54b of both the movable front wings 54 are stood up) to accurately detect the state of the necessary inspection point Pe. At this time, the first propellers 56 and the second propellers 57 are driven as appropriate so that the unmanned airplane 12 hovers in the air.

In step S26, following step S25 in which the unmanned airplane 12 is put in the VTOL mode Mv or step S27 in which it is determined that the entire area of the necessary inspection point Pe has not been detected, the low speed sensing Ss is started, and the processing proceeds to step S27. In step S26, flight in the VTOL mode Mv is started or continued, and the detection area DA (see FIGS. 7, 8, and so on) is defined on the detection target 15 by driving the state detection sensor 34, so that the low speed sensing Ss of the necessary inspection point Pe in the detection target 15 is started or continued. In step S26, the detection area DA is moved to efficiently detect the entire area of the necessary inspection point Pe by flying the unmanned airplane 12 according to the flight route of a flight plan generated for the necessary inspection point Pe in step S23. In step S26, the detection result of the low speed sensing Ss is obtained from the state detection sensor 34 via the unmanned airplane side communication unit 33 and the control side communication unit 22 and the detection result is stored in the internal memory 21a or the storage unit 25.

In step S27, following step S26 in which the low speed sensing Ss is started, a decision is made as to whether the entire area of the necessary inspection point Pe is detected, and the processing proceeds to step S28 in the case of Yes or returns to S26 in the case of No. In step S27, the decision is made as to whether the detection area DA has been defined over the entire area of the necessary inspection point Pe (that is, whether the state of the entire area of the necessary inspection point Pe has been detected by the low speed sensing Ss). In step S27, this decision is repeated while continuing the low speed sensing Ss until the detection area DA is defined over the entire area of the necessary inspection point Pe (until the state of the entire area is detected).

In step S28, following step S27 in which it is determined that the entire area of the necessary inspection point Pe has been detected, a decision is made as to whether another necessary inspection point Pe extracted is present, and the processing proceeds to step S29 in the case of Yes or this sensing processing ends in the case of No. In step S28, when another necessary inspection point Pe is present, the processing proceeds to step S29 to accurately detect the states of the remaining necessary inspection points Pe and this sensing processing is completed when the states of all necessary inspection points Pe have been accurately detected.

In step S29, following step S28 in which it is determined that another necessary inspection point Pe is present, the unmanned airplane 12 is put in the airplane mode Mp, and the processing returns to step S24. In step S29, the unmanned airplane 12 is put in the airplane mode Mp (that is, the rotary wing parts 54b of both the movable front wings 54 are laid down) to fly the unmanned airplane 12 having performed the low speed sensing Ss on the entire area of the necessary inspection point Pe to another necessary inspection point Pe. At this time, the first propellers 56 and the second propellers 57 are driven as appropriate so that the unmanned airplane 12 hovers in the air.

Next, the operation of the wide area sensor system 10 during detection of the state of the detection target 15 will be described with reference to FIGS. 7 and 8. FIGS. 7 and 8 show examples in which the detection target 15 is assumed to be a farm land (agricultural field) FL. In the examples, in crops planted in the farm land FL (the detection target 15), the content and normalized difference vegetation index (NDVI) of a raising element corresponding to the wavelength band set by a wavelength sensor (the state detection sensor 34) are assumed to be the state of the farm land FL (the detection target 15). That is, in the examples, the content and normalized difference vegetation index (NDVI) of the raising element of crops planted in the farm land FL (the detection target 15) are detected using the wide area sensor system 10. Accordingly, in the examples, a flight plan for assuming the farm land FL (see FIGS. 7 and 8) to be the detection target 15 is set.

It is assumed that the power of the wide area sensor system 10 is first turned on and the farm land FL shown in FIG. 7 is set as the detection target 15. Then, the processing proceeds to step S1 in the flowchart in FIG. 5 to obtain a flight plan for assuming the farm land FL to be the detection target 15. Then, the processing proceeds to step S2 in the flowchart in FIG. 5 to put the unmanned airplane 12 in the VTOL mode My (see FIG. 4), and the processing proceeds to step S3 to take the unmanned airplane 12 off the dock 14 (see FIG. 1) vertically. After that, the processing proceeds to step S4 in the flowchart in FIG. 5 to put the unmanned airplane 12 in the airplane mode Mp (see FIG. 3), and the processing proceeds to step S5 and then step S6 to repeat the process and move the unmanned airplane 12 to the first arrival point Bs (see FIG. 7) in the farm land FL from above the dock 14. Then, the processing proceeds to step S7 in the flowchart in FIG. 5 to perform sensing processing on the farm land FL.

In the sensing processing, the processing proceeds to step S21 and then step S22 in the flowchart in FIG. 6 and repeats the process, flies the unmanned airplane 12 from point Bs as shown in FIG. 7, performs the high speed sensing Sf while moving the detection area DA, and efficiently detects the entire area of the detection target 15. This enables the wide area sensor system 10 to first obtain the content and normalized difference vegetation index (NDVI) of raising elements in crops planted in the farm land FL at the resolution corresponding to the high speed sensing Sf. After that, the processing proceeds to step S23 in the flowchart in FIG. 6 to extract the necessary inspection point Pe in the farm land FL (the detection target 15). In the example shown in FIG. 7, it is assumed that, in the farm land FL, there is one necessary inspection point Pe having the content and normalized difference vegetation index (NDVI) of raising elements that fall outside the assumed range.

Then, the processing proceeds to step S24 and then step S25 in the flowchart in FIG. 6 to put the unmanned airplane 12 in the VTOL mode My (see FIG. 4). The processing proceeds to step S26 and then step S27 to perform the low speed sensing Ss on the extracted necessary inspection point Pe as shown in FIG. 8. Then, step S26 and step S27 in the flowchart in FIG. 6 are repeated to perform the low speed sensing Ss while moving the detection area DA by flight of the unmanned airplane 12, so that the entire area of the extracted necessary inspection point Pe is detected efficiently. This enables the wide area sensor system 10 to detect the content and normalized difference vegetation index (NDVI) of raising elements of crops planted in the necessary inspection point Pe in the farm land FL at the high resolution corresponding to the low speed sensing Ss. Accordingly, the content and normalized difference vegetation index (NDVI) of raising elements of crops planted in the necessary inspection point Pe can be accurately detected. In the example shown in FIG. 7, since there is only one necessary inspection point Pe in the farm land FL, the processing proceeds to step S27 and then step S28 in the flowchart in FIG. 6 and the sensing processing ends (step S7 in the flowchart in FIG. 5).

After that, the processing proceeds to step S8 in the flowchart in FIG. 5 to put the unmanned airplane 12 in the airplane mode Mp (see FIG. 3). The processing proceeds to step S9 and then step S10 to repeat the process to move the unmanned airplane 12 from the necessary inspection point Pe (the detection target 15) to a position above the dock 14 (see FIG. 1). Then, the processing proceeds to step S11 in the flowchart in FIG. 5 to put the unmanned airplane 12 in the VTOL mode My (see FIG. 4). Next, the processing proceeds to step S12 to land the unmanned airplane 12 on the dock 14 vertically. After that, in the wide area sensor system 10, electric power is supplied and charged to the unmanned airplane 12 (the charge mechanism unit 38 thereof) from the dock 14 via the feet 51.

The wide area sensor system 10 can obtain the content and normalized difference vegetation index (NDVI) of raising elements in crops planted in the farm land FL (the detection target 15) over the entire area of the farm land FL at the resolution corresponding to the high speed sensing Sf. In addition, the wide area sensor system 10 extracts the necessary inspection point Pe based on the detection result of the high speed sensing Sf and can obtain the content and normalized difference vegetation index (NDVI) of raising elements over the entire area of the necessary inspection point Pe at the resolution corresponding to the low speed sensing Ss. Accordingly, the wide area sensor system 10 can identify the point at which raising elements are insufficient or excess or the point at which there is delay or progression in growth in crops planted in the farm land FL appropriately and quickly. Therefore, even when the farm land FL is wide, the point at which manure or water is insufficient or excess can be identified appropriately as a narrow area and the crops in the point can be grown more efficiently by supplying manure or water at the point or by reducing manure or water at the point.

As described above, the wide area sensor system 10 according to the first embodiment of the invention can perform the high speed sensing Sf by driving the state detection sensor 34 while flying the unmanned airplane 12 at high speed in the airplane mode Mp. Accordingly, the wide area sensor system 10 can easily detect the state even when the detection target 15 ranges widely.

In addition, the wide area sensor system 10 can perform the low speed sensing Ss by driving the state detection sensor 34 while flying the unmanned airplane 12 at low speed in the VTOL mode Mv. Accordingly, the wide area sensor system 10 can accurately detect the state of any point in the detection target 15 by performing the low speed sensing Ss at the point in the detection target 15. Even when the detection target 15 ranges widely, the wide area sensor system 10 can detect the state efficiently and appropriately.

In addition, the wide area sensor system 10 detects the state of the detection target 15 using the unmanned airplane 12 in which switching between high speed flight in the airplane mode Mp and low speed flight in the VTOL mode Mv is enabled. Accordingly, even when the detection target 15 ranges very widely, the wide area sensor system 10 can perform the high speed sensing Sf over the entire area using the unmanned airplane 12 and can detect the state of the detection target 15. The reason is described below. In an unmanned airplane that flies as a helicopter, the speed cannot be easily increased since the rotor is used to produce a lift force and a thrust force and the fuel efficiency is not good. On the other hand, since the unmanned airplane 12 in the wide area sensor system 10 flies at high speed using the airplane mode Mp, which can glide through the air, a lift force produced on the airplane body can be used, the fuel efficiency is good, the flight speed is high, and the flight distance and flight duration can be increased. Even when the distance to the detection target 15 is long, the unmanned airplane 12 can easily reach the detection target 15 and the state of the detection target 15 can be detected.

In the wide area sensor system 10, switching between high speed flight in the airplane mode Mp and low speed flight in the VTOL mode Mv can be performed by changing the attitudes of the first propellers 56 as propulsive units relative to the main body 52. This enables the wide area sensor system 10 to switch between high speed flight in the airplane mode Mp and low speed flight in the VTOL mode Mv with the simple structure.

The wide area sensor system 10 enables the first propellers 56 as propulsive units to change their attitudes relative to the main body 52 by mounting the first propellers 56 in the movable front wings 54 (movable wings). Accordingly, the wide area sensor system 10 enables the first propellers 56 to change their attitudes relative to the main body 52 without using a complicated mechanism, thereby easily ensuring the mounting strength of the first propellers 56.

The wide area sensor system 10 enables the movable front wings 54 (movable wings) provided in front of both the main wings 53 to rotate about a rotary shaft extending horizontally relative to the main body 52 in the unmanned airplane 12 and has the first propellers 56 as propulsive units in the movable front wings 54 (movable wings). Accordingly, the wide area sensor system 10 achieves improved stability and easy control by putting the unmanned airplane 12 in the airplane mode Mp, thereby enabling balanced high speed flight. In addition, the wide area sensor system 10 achieves stable low speed flight by putting the unmanned airplane 12 in the VTOL mode Mv. In the wide area sensor system 10, this makes the high speed flight and low speed flight of the unmanned airplane 12 stable while improving the fuel efficiency, thereby enabling the high speed sensing Sf and the low speed sensing Ss to be performed appropriately.

In the wide area sensor system 10, the unmanned airplane 12 can fly like a helicopter by standing the movable front wings 54 (the rotary wing parts 54b thereof) up in the VTOL mode Mv and rotating the first propellers 56 about the rotary shaft extending in an up-down direction. In the wide area sensor system 10, the unmanned airplane 12 can take off and land in a vertical direction in the VTOL mode Mv, so a launch pad or runway is not necessary and the entire structure can be small-sized, thereby improving the degree of freedom of a use place.

The wide area sensor system 10 extracts the necessary inspection point Pe in the detection target 15 based on a detection result by the high speed sensing Sf and performs the low speed sensing Ss on the extracted necessary inspection point Pe. Accordingly, the wide area sensor system 10 detects a rough state using the high speed sensing Sf and accurately detects the state of the necessary inspection point Pe extracted based on the high speed sensing Sf using the low speed sensing Ss. Accordingly, the wide area sensor system 10 can easily detect the state in the entire area even when the detection target 15 ranges widely and can easily detect the accurate state of the necessary point. In addition, since the wide area sensor system 10 extracts the necessary inspection point Pe based on detection by the high speed sensing Sf, the state can be detected easily and appropriately even for the detection target 15 about which no information is known in advance.

Accordingly, in the wide area sensor system 10 according to the first embodiment of the invention, the state can be detected appropriately even when the detection target 15 ranges widely.

FIGS. 7 and 8 in the above first embodiment show an example in which the detection target 15 is indicated as the farm land (agricultural field) FL and a wavelength sensor is indicated as the state detection sensor 34. However, even when the detection target 15 is indicated as the farm land FL, a temperature sensor, a hyper-spectrum camera, an imaging device, a laser scanning device, or the like may be used as the state detection sensor 34, and the invention is not limited to the structure of the above first embodiment. For example, when a laser scanning device is used, water or manure can be adjusted by measuring the height of crops in the farm land FL. When a hyper-spectrum camera is used, water or manure can be adjusted more finely by measuring the amount of raising elements and the amount of water in addition to the height of crops in the farm land FL.

Embodiment 2

Next, a wide area sensor system 10A as a wide area sensor system according to a second embodiment of the invention will be described with reference to FIGS. 9 to 11. The wide area sensor system 10A according to the second embodiment is an example in which sensing processing in in-flight detection processing is different from that in the wide area sensor system 10 in the first embodiment. The basic structure and operation of the wide area sensor system 10A according to the second embodiment are the same as in the wide area sensor system 10 according to the first embodiment. Accordingly, FIGS. 1 and 2 are used to show the entire structure. Note that the same components are given the same reference symbols, and detailed descriptions are omitted.

The wide area sensor system 10A according to the second embodiment uses a 360 degree camera, a laser scanning device, and a noncontact type temperature sensor as the state detection sensor 34 (see FIG. 1). In addition, since the wide area sensor system 10A applies measurement results while matching the image of the 360 degree camera with the data of a point set by the laser scanning device and the temperature sensor, it is possible to obtain an image including information of a three-dimensional shape indicated by three-dimensional coordinate positions at very high accuracy and temperature information at the individual points. These components are provided in the main body 52 of the unmanned airplane 12 as in the first embodiment and the other components are the same as in the wide area sensor system 10, so the appearance is not different in terms of outer structure.

Next, sensing processing (step S7) in in-flight detection processing (in-flight detection method (the flowchart in FIG. 5)) in the wide area sensor system 10A according to the second embodiment will be described. This sensing processing detects the state of the detection target 15 by performing the high speed sensing Sf and the low speed sensing Ss as appropriate on the detection target 15 according to a flight plan as in the first embodiment. In the sensing processing in the second embodiment, the necessary reconnaissance point Ps (see FIG. 10) is preset in the detection target 15, the high speed sensing Sf is performed on the detection target 15 until the necessary reconnaissance point Ps is reached. When the necessary reconnaissance point Ps is reached, the state of the necessary reconnaissance point Ps is detected accurately using the low speed sensing Ss (see FIGS. 10 and 11). The necessary reconnaissance point Ps is the point whose state needs to be detected accurately using the wide area sensor system 10A and, for example, the point in the detection target 15 at which occurrence of any event has been recognized in advance. The necessary reconnaissance point Ps may be set by operating the operation input unit 24 of the external control apparatus 11 or the operation unit 44 of the remote controller 13 or may be obtained from an external device. The necessary reconnaissance point Ps may be set in either the singular or the plural.

Figure 9:
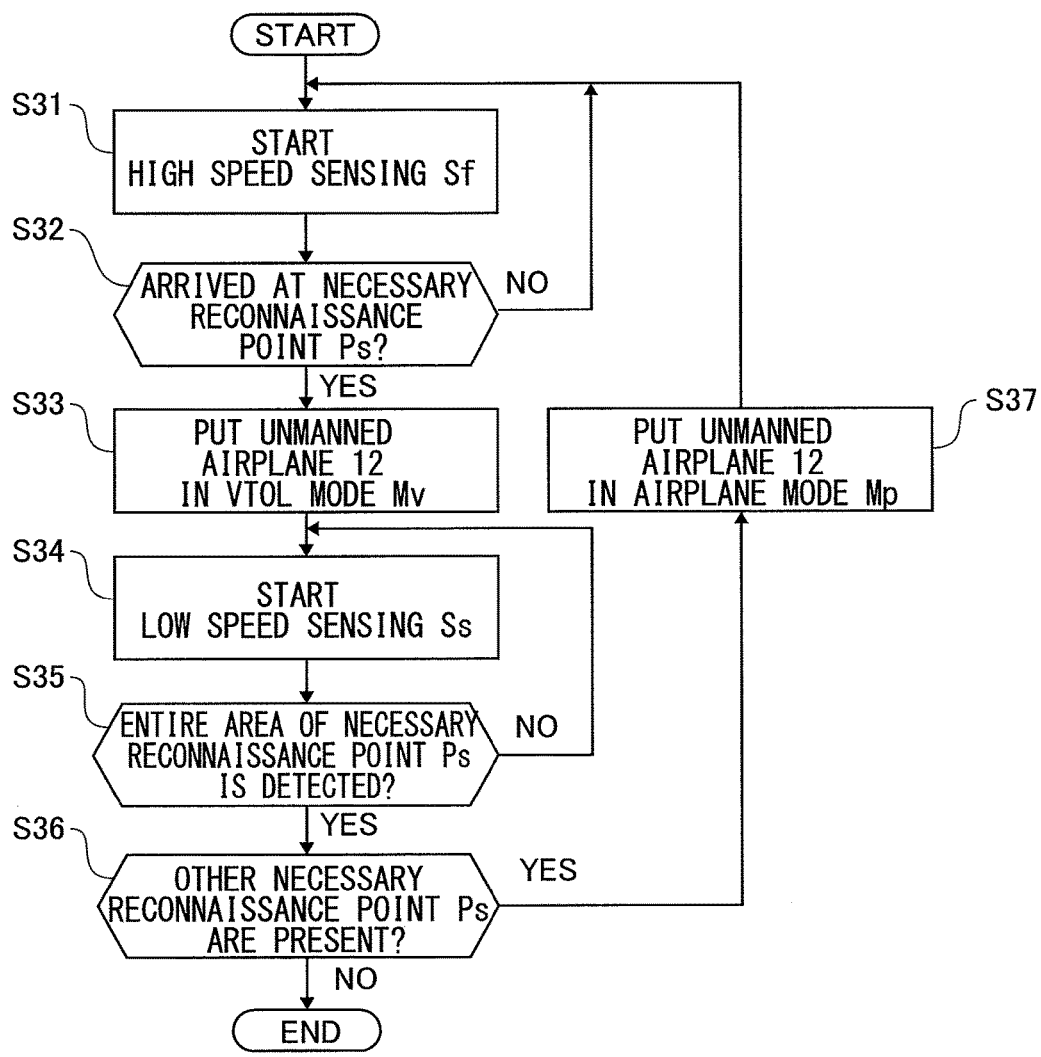
FIG. 9 is a flowchart showing sensing processing in in-flight detection processing executed by, for example, the integrated control unit of a wide area sensor system according to a second embodiment.

FIG. 9 is a flowchart showing sensing processing performed by the integrated control unit 21 in the second embodiment. This sensing processing is started when the unmanned airplane 12 reaches the first arrival point in the detection target 15. The first arrival point is set from the viewpoint of effective use of high speed flight in the airplane mode Mp until the necessary reconnaissance point Ps is reached while considering the positional relationship between the dock 14 and the detection target 15. When a plurality of the necessary reconnaissance points Ps are set, the necessary reconnaissance points Ps are given their ordinal ranks so that the necessary reconnaissance points Ps are visited efficiently. In the sensing processing in the second embodiment, a flight plan including a flight route considering the shapes, sizes, and so on of the preset necessary reconnaissance points Ps and the detection area DA is generated so that the detection area DA is moved to efficiently detect the entire area of the necessary reconnaissance points Ps set in advance.

In step S31, the high speed sensing Sf is started, and the processing proceeds to step S32. Step S31 is the stage at which the unmanned airplane 12 flying in the airplane mode Mp reaches the first arrival point in the detection target 15 in the flight plan in the in-flight detection processing (the flowchart in FIG. 5). Accordingly, in step S31, the unmanned airplane 12 drives the state detection sensor 34 while continuing flight in the airplane mode Mp, defines the detection area DA (see FIGS. 10 and 11) on the detection target 15, and starts the high speed sensing Sf of the detection target 15. In step S31, the unmanned airplane 12 is flown according to a flight route set in the flight plan, passes above the detection target 15 while performing the high speed sensing Sf, and moves toward the necessary reconnaissance point Ps. In step S31, when the processing returns from step S36, the above operation is performed on the necessary reconnaissance point Ps having the number next to the number given to the necessary reconnaissance point Ps for which the state has been detected before step S36. In step S31, the detection result of the high speed sensing Sf is obtained from the state detection sensor 34 via the unmanned airplane side communication unit 33 and the control side communication unit 22 and the detection result is stored in the internal memory 21a or the storage unit 25.

In step S32, following step S31 in which the high speed sensing Sf is started, a decision is made as to whether the necessary reconnaissance point Ps to be detected is reached, and the processing proceeds to step S33 in the case of Yes or returns to S31 in the case of No. In step S32, the decision is repeated while continuing the high speed sensing Sf until the necessary reconnaissance point Ps is reached.

In step S33, following step S32 in which it is determined that the necessary reconnaissance point Ps has been reached, the unmanned airplane 12 is put in the VTOL mode Mv, and the processing proceeds to step S34. In step S33, since the unmanned airplane 12 has moved to the necessary reconnaissance point Ps, the unmanned airplane 12 is placed in the VTOL mode Mv (that is, the rotary wing parts 54b of both the movable front wings 54 are stood up) to accurately detect the state of the necessary reconnaissance point Ps. At this time, the first propellers 56 and the second propellers 57 are driven as appropriate so that the unmanned airplane 12 hovers in the air.

In step S34, following step S33 in which the unmanned airplane 12 is put in the VTOL mode Mv or step S35 in which it is determined that the entire area of the necessary reconnaissance point Ps has not been detected, the low speed sensing Ss is started or continued, and the processing proceeds to step S35. In step S34, flight in the VTOL mode Mv is started and the detection area DA (see FIGS. 10, 11, and so on) is formed on the detection target 15 by driving the state detection sensor 34, so that the low speed sensing Ss of the necessary reconnaissance point Ps in the detection target 15 is started. In step S34, the detection area DA is moved to efficiently detect the entire area of the necessary reconnaissance point Ps by flying the unmanned airplane 12 according to the flight route of a flight plan generated in advance for the necessary reconnaissance point Ps. In step S34, the detection result of the low speed sensing Ss is obtained from the state detection sensor 34 via the unmanned airplane side communication unit 33 and the control side communication unit 22 and the detection result is stored in the internal memory 21a or the storage unit 25.

In step S35, following step S34 in which the low speed sensing Ss is started, a decision is made as to whether the entire area of the necessary reconnaissance point Ps is detected, and the processing proceeds to step S36 in the case of Yes or returns to S34 in the case of No. In step S35, the decision is made as to whether the detection area DA has been defined over the entire area of the necessary reconnaissance point Ps (that is, whether the state of the entire area of the necessary reconnaissance point Ps has been detected by the low speed sensing Ss). In step S35, this decision is repeated while continuing the low speed sensing Ss until the detection area DA is defined over the entire area of the necessary reconnaissance point Ps (until the state of the entire area is detected).

In step S36, following step S35 in which it is determined that the entire area of the necessary reconnaissance point Ps has been detected, a decision is made as to whether another necessary reconnaissance point Ps is present, and the processing proceeds to step S37 in the case of Yes or this sensing processing ends in the case of No. In step S36, the decision is made as to whether another necessary reconnaissance point Ps is present (that is, whether the states of all of a plurality of necessary reconnaissance points Ps have been accurately detected). In step S36, when another necessary reconnaissance point Ps is present, the processing proceeds to step S37 to accurately detect the state of the remaining necessary reconnaissance point Ps and this sensing processing ends when the states of all necessary reconnaissance points Ps have been accurately detected.

In step S37, following step S36 in which it is determined that another necessary reconnaissance point Ps is present, the unmanned airplane 12 is put in the airplane mode Mp, and the processing returns to step S31. In step S37, the unmanned airplane 12 is put in the airplane mode Mp (that is, the rotary wing parts 54b of both the movable front wings 54 are laid down) to fly the unmanned airplane 12 having performed the low speed sensing Ss on the entire area of the necessary reconnaissance point Ps to the other necessary reconnaissance point Ps. At this time, the first propellers 56 and the second propellers 57 are driven as appropriate so that the unmanned airplane 12 hovers in the air.

Next, the operation of the wide area sensor system 10A during detection of the state of the detection target 15 will be described with reference to FIGS. 10 and 11. FIGS. 10 and 11 show examples in which the detection target 15 is assumed to be a pipeline PL. In the examples, the shape, appearance (such as a color and scratch), and temperature of the pipeline PL (the detection target 15) represent the state of the pipeline PL (the detection target 15). That is, the shape, appearance (such as a color and scratch), and temperature of the pipeline PL (the detection target 15) are detected using the wide area sensor system 10 in the examples. Accordingly, in the examples, a flight plan for assuming the pipeline PL (see FIGS. 10 and 11) to be the detection target 15 is set. In addition, in the examples, the two necessary reconnaissance points Ps are set in the pipeline PL (see FIG. 10). Since the detection area DA is assumed to cover the width dimension of the pipeline PL in the examples, the unmanned airplane 12 is flown along the pipeline PL (the necessary reconnaissance point Ps thereof) (see FIGS. 10 and 11).

Figure 10:
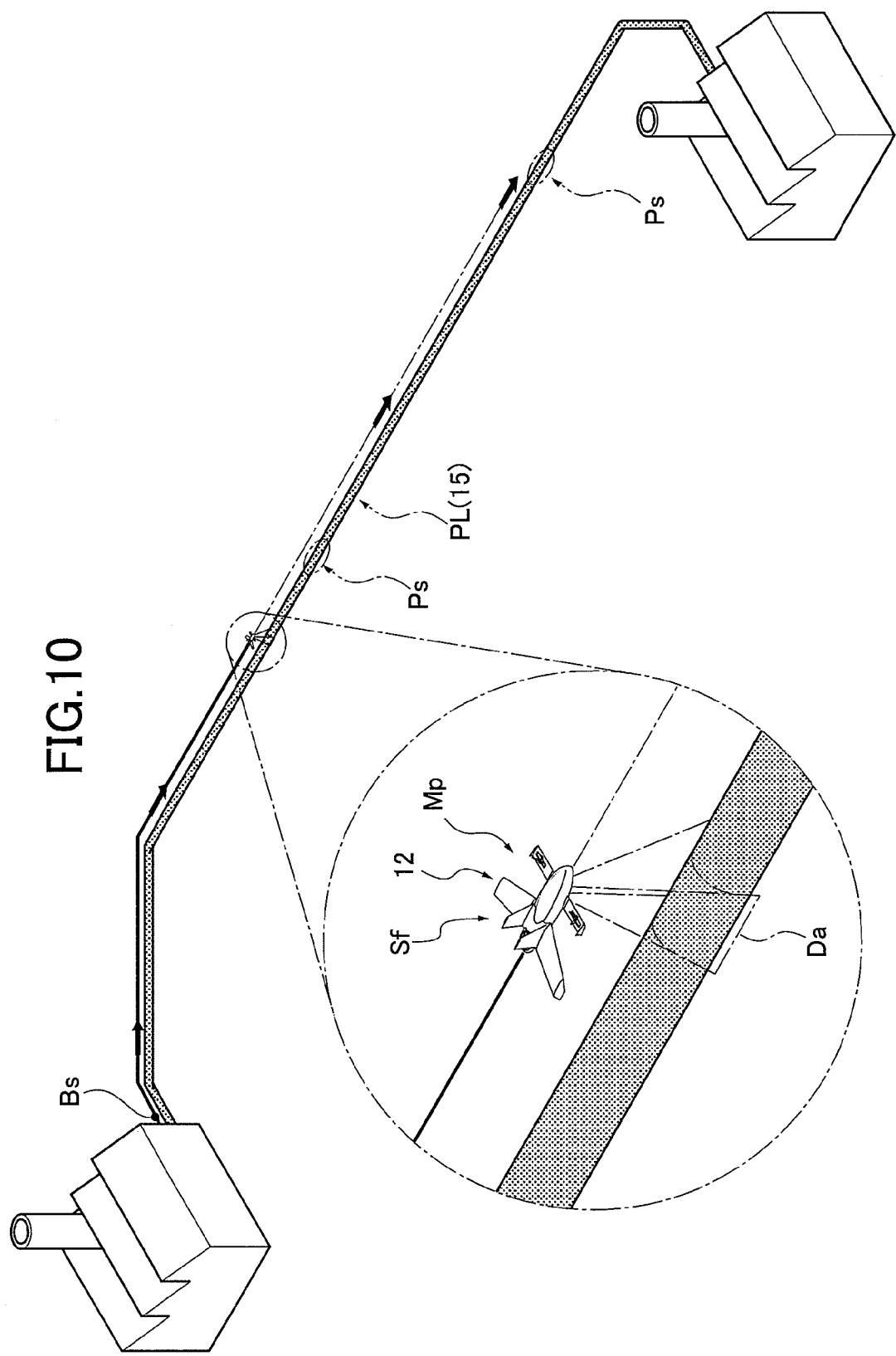
FIG. 10 is an explanatory view illustrating how the unmanned airplane in the airplane mode performs the high speed sensing over a pipeline in the wide area sensor system.
Figure 11:
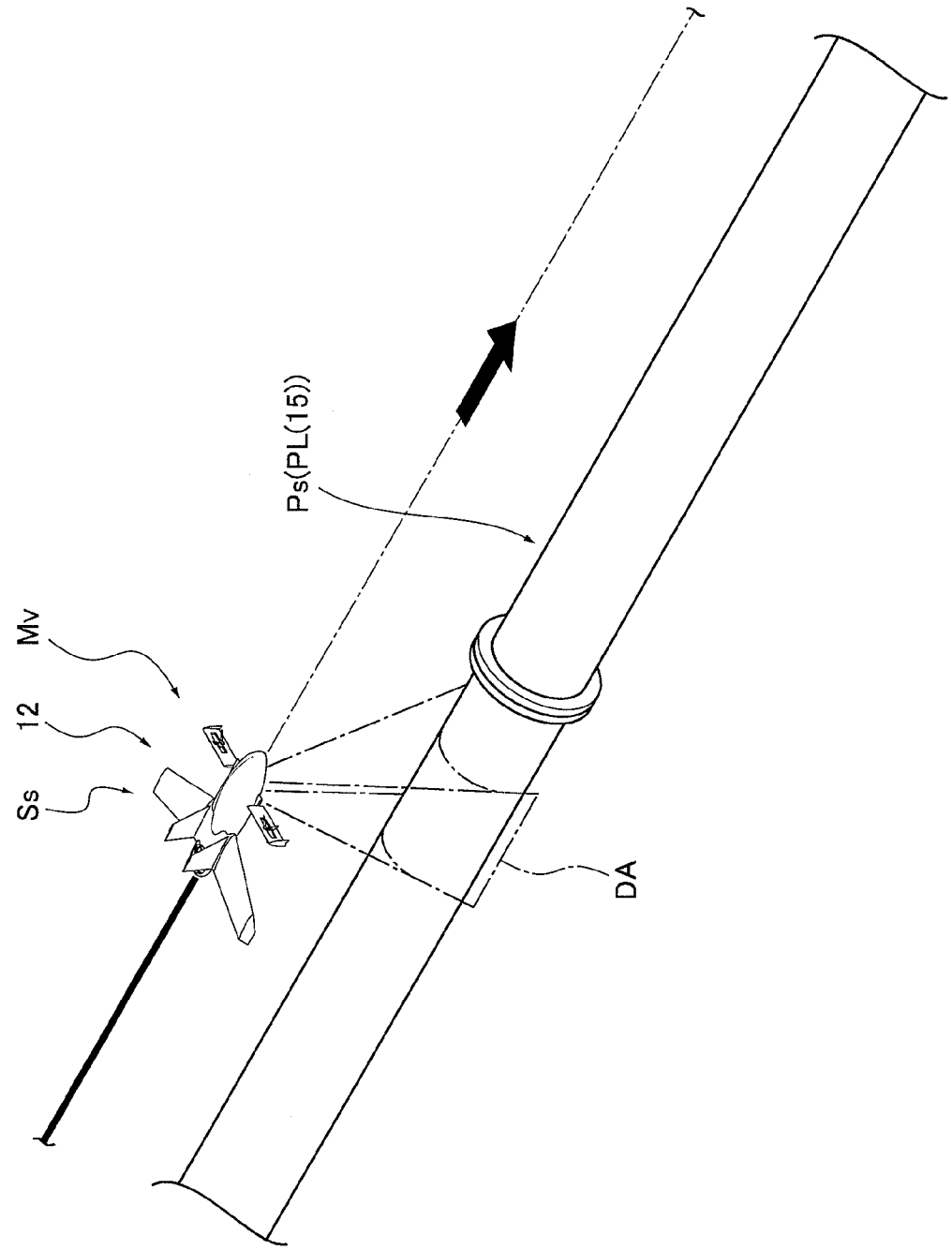
FIG. 11 is an explanatory view illustrating how the unmanned airplane in the VTOL mode performs the low speed sensing on a necessary reconnaissance point of the pipeline.

It is assume that the power of the wide area sensor system 10 is first turned on, the pipeline PL shown in FIG. 10 is set as the detection target 15, and the two necessary reconnaissance points Ps are set in the pipeline PL. Then, the processing proceeds to step S1 in the flowchart in FIG. 5 to obtain a flight plan for assuming the pipeline PL to be the detection target 15. Then, the processing proceeds to step S2 in the flowchart in FIG. 5 to put the unmanned airplane 12 in the VTOL mode Mv (see FIG. 4), and the processing proceeds to step S3 to take the unmanned airplane 12 off the dock 14 (see FIG. 1) vertically. After that, the processing proceeds to step S4 in the flowchart in FIG. 5 to put the unmanned airplane 12 in the airplane mode Mp (see FIG. 3), and the processing proceeds to step S5 and then step S6 to repeat the process and move the unmanned airplane 12 to the first arrival point Bs (see FIG. 10) in the pipeline PL from a position above the dock 14. Then, the processing proceeds to step S7 in the flowchart in FIG. 5 to perform sensing processing on the pipeline PL.

In the sensing processing, the processing proceeds to step S31 and then step S32 in the flowchart in FIG. 9, repeats the process, flies the unmanned airplane 12 from point Bs as shown in FIG. 7 to move the detection area DA, and performs the high speed sensing Sf to roughly detect the state of the detection target 15 until the necessary reconnaissance point Ps is reached. This enables the wide area sensor system 10 to first obtain the image, three-dimensional positional information, and temperature information until the necessary reconnaissance point Ps is reached at the resolution corresponding to the high speed sensing Sf. After that, the processing proceeds to step S33 in the flowchart in FIG. 9 to put the unmanned airplane 12 in the VTOL mode Mv (see FIG. 4), and the processing proceeds to step S34 and then step S35 to perform the low speed sensing Ss on the first necessary reconnaissance point Ps, as shown in FIG. 11.

Then, step S34 and step S35 are repeated in the flowchart in FIG. 9, such that the detection area DA is moved by flying the unmanned airplane 12, performs the low speed sensing Ss, and efficiently detects the entire area of the necessary reconnaissance point Ps. This enables the wide area sensor system 10 to obtain the image, three-dimensional positional information, and temperature information of the necessary reconnaissance point Ps set in the pipeline PL at the high resolution corresponding to the low speed sensing Ss. Since the number of the necessary reconnaissance points Ps in the pipeline PL is two in the example shown in FIG. 10, the processing proceeds to step S35 and step S36, and then returns to step S31 in the flowchart in FIG. 9 so as to repeat the same process as above. As a result, the image, three-dimensional positional information, and temperature information of the pipeline PL until the other necessary reconnaissance point Ps in the pipeline PL can be obtained at the resolution corresponding to the high speed sensing Sf; while the image, three-dimensional positional information, and temperature information of the pipeline PL of the other necessary reconnaissance point Ps in the pipeline PL can be obtained at the high resolution corresponding to the low speed sensing Ss. After that, the processing proceeds to step S35 and then step S36 in the flowchart in FIG. 9 and the sensing processing ends (step S7 in the flowchart in FIG. 5).

After that, the processing proceeds to step S8 in the flowchart in FIG. 5 to put the unmanned airplane 12 in the airplane mode Mp (see FIG. 3), and the processing proceeds to step S9 and then step S10 to repeat the process to move the unmanned airplane 12 from the necessary reconnaissance point Ps (the detection target 15) to a position above the dock 14 (see FIG. 1). Then, the processing proceeds to step S11 in the flowchart in FIG. 5 to put the unmanned airplane 12 in the VTOL mode Mv (see FIG. 4), and the processing proceeds to step S12 to vertically land the unmanned airplane 12 on the dock 14. After that, in the wide area sensor system 10, electric power is supplied and charged to the unmanned airplane 12 (the charge mechanism unit 38 thereof) from the dock 14 via the feet 51.

The wide area sensor system 10A can obtain the images, three-dimensional information, and temperature information until the necessary reconnaissance point Ps in the pipeline PL as the detection target 15 is reached, at the resolution corresponding to the high speed sensing Sf. In addition, the wide area sensor system 10A can obtain the images, three-dimensional information, and temperature information of the necessary reconnaissance point Ps at the resolution corresponding to the low speed sensing Ss. Accordingly, the wide area sensor system 10A can determine the state of the necessary reconnaissance point Ps based on the image, three-dimensional information, and temperature information of the necessary reconnaissance point Ps in the pipeline PL. In addition, the wide area sensor system 10A can determine whether any event has occurred in a point other than the necessary reconnaissance point Ps in the pipeline PL based on the image, three-dimensional information, and temperature information of the point other than the necessary reconnaissance point Ps in the pipeline PL. Breakage, deformation, and the like can be found based on changes in color and shape of the image and three-dimensional information. Leakage or the like of a transported object can be found based on temperature information. Accordingly, even when the pipeline PL ranges very widely, it is possible to appropriately identify what event has occurred in the necessary reconnaissance point Ps and easily check whether any event has occurred in another point.

Since the wide area sensor system 10A according to the second embodiment of the invention has basically the same structure as the wide area sensor system 10 according to the first embodiment, basically the same effects as in the first embodiment can be obtained.

In addition to this, the wide area sensor system 10A according to the second embodiment performs the high speed sensing Sf on the detection target 15 until the preset necessary reconnaissance point Ps is reached and performs the low speed sensing Ss on the necessary reconnaissance point Ps. Accordingly, the wide area sensor system 10 accurately detects the state using the low speed sensing Ss for the point that needs to be detected accurately and, during movement to the point, detects the rough state of the detection target 15 using the high speed sensing Sf. Therefore, the wide area sensor system 10 can easily detect the state of the entire area even when the detection target 15 ranges widely and can easily detect the accurate state of the necessary point in the area. In addition, since the wide area sensor system 10 performs the high speed sensing Sf on the detection target 15 during movement to the necessary reconnaissance point Ps, the state of the detection target 15 can be detected efficiently.

Accordingly, the wide area sensor system 10A according to the second embodiment of the invention can detect the state appropriately even when the detection target 15 ranges widely.

In the above second embodiment, the high speed sensing Sf is performed on the detection target 15 until the necessary reconnaissance point Ps is reached. However, the invention is not limited to the above structure of the second embodiment. Regardless of the time order of the low speed sensing Ss on the necessary reconnaissance point Ps, the high speed sensing Sf may be performed on the remaining detection target 15. Since the entire area of the detection target 15 including the necessary reconnaissance point Ps can be detected in such a structure, the state of the detection target 15 can be grasped more appropriately.

In addition, in the above second embodiment, the low speed sensing Ss is performed only on the necessary reconnaissance point Ps. However, the necessary inspection point Pe (see FIG. 7 and so on) may be extracted as in the first embodiment at a point other than the necessary reconnaissance point Ps in the detection target 15 on which the high speed sensing Sf has been performed, and the low speed sensing Ss may be performed also on the necessary inspection point Pe. In such a structure, the state of the detection target 15 can be grasped more appropriately.

Although in the above embodiments, the wide area sensor systems 10 and 10A as examples of the wide area sensor system according to the invention have been described, the invention is not limited to the above embodiments as long as the wide area sensor system includes the unmanned airplane in which switching between the airplane mode for high speed flight and the VTOL mode for low speed flight is enabled, the state detection sensor provided in the unmanned airplane and driven to detect the state of the detection target, and the external control apparatus controlling the flight of the unmanned airplane and the driving of the state detection sensor, in which the external control apparatus performs high speed sensing by driving the state detection sensor while performing the high speed flight of the unmanned airplane in the airplane mode and performs low speed sensing by driving the state detection, sensor while performing the low speed flight of the unmanned airplane in the VTOL mode.

In addition, in the sensing processing of the in-flight detection processing (in-flight detection method) in the first embodiment described above, the high speed sensing Sf is first performed on the entire area of the detection target 15, the necessary inspection point Pe is extracted based on the result, and the state of the extracted necessary inspection point Pe is accurately detected by the low speed sensing Ss. On the other hand, in the sensing processing of the in-flight detection processing (in-flight detection method) in the second embodiment described above, the necessary reconnaissance point Ps in the detection target 15 is preset, the high speed sensing Sf is performed on the detection target 15 until the necessary reconnaissance point Ps is reached, and, when the necessary reconnaissance point Ps is reached, the state of the necessary reconnaissance point Ps is accurately detected. However, the invention is not limited to the structures of the above embodiments as long as the high speed sensing Sf and the low speed sensing Ss are performed on the detection target 15 and how the high speed sensing Sf and the low speed sensing Ss are used only need to be set as appropriately.

In addition, in FIGS. 7 and 8 of the first embodiment, the farm land FL is shown as an example of the detection target 15. In FIGS. 10 and 11 above, the pipeline PL is shown as an example of the detection target 15. However, the detection target 15 is not limited to the above embodiments and may be, for example, a paddy field, forest, electric feeder line, improved land, construction field, road, mining, power plant, digging, ruin, coastline, volcano, devastated district, and so on as long as the detection target 15 can be detected by the state detection sensor 34 provided in the unmanned airplane 12.

In addition, FIGS. 7 and 8 of the first embodiment show the content and normalized difference vegetation index (NDVI) of the raising elements of crops planted in the farm land FL as an example of the state of the detection target 15. In addition, FIGS. 10 and 11 of the second embodiment show the image, three-dimensional positional information, and temperature information of the pipeline PL as an example of the state of the detection target 15. However, the state of the detection target 15 is not limited to the above embodiments as long as it can be detected by the state detection sensor 34 provided in the unmanned airplane 12. In other words, the state detection sensor 34 is not limited to the above embodiments as long as it detects the state of the detection target 15 from the unmanned airplane 12 that is flying, and the aspect can be set as appropriate depending on the detection target 15 (the state thereof) to be detected.

In the above embodiments, the unmanned airplane 12 has the structure shown in FIGS. 3 and 4. However, the unmanned airplane may have another shape and structure in which, for example, the number of vertical tails provided on the main body (52) may be one, the shape of a point (52a) at which the second propellers 57 are provided may be changed, or the shapes of the main body (52) and both the movable front wings (54) may be changed as long as switching between the airplane mode for high speed flight and the VTOL mode for low speed flight is enabled and the invention is not limited to the structures of the above embodiments.

In the above embodiments, the first propellers 56 as propulsive units are provided in both the movable front wings 54 of the unmanned airplane 12. However, the propulsive units are not limited to the above structures of the embodiments as long as they provide a thrust force for the main body (52) and can change their attitudes (output direction) relative to the main body (52).

The wide area sensor systems according to the embodiments of the invention have been described above, but the specific structure is not limited to the embodiments and the design may be changed or added without departing from the spirit of the invention.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A wide area sensor system comprising:
an unmanned airplane being switchable between an airplane mode for high speed flight and a VTOL mode for low speed flight;
a state detection sensor provided in the unmanned airplane, the state detection sensor being driven to detect a state of a detection target; and
an external control apparatus that controls flight of the unmanned airplane and driving of the state detection sensor,
wherein the external control apparatus performs high speed sensing by driving the state detection sensor while performing the high speed flight of the unmanned airplane in the airplane mode and performs low speed sensing by driving the state detection sensor while performing the low speed flight of the unmanned airplane in the VTOL mode.

2. The wide area sensor system according to claim 1,
wherein the unmanned airplane has a main body and a propulsive unit provided in the main body to change an attitude of the unmanned airplane, and
the external control apparatus switches between the airplane mode and the VTOL mode by changing the attitude of the propulsive unit relative to the main body.

3. The wide area sensor system according to claim 2,
wherein the unmanned airplane has a movable wing provided on the main body to change an attitude of the unmanned airplane, and
the propulsive unit is a propeller provided in the movable wing.

4. The wide area sensor system according to claim 1,
wherein the unmanned airplane has a main wing provided on the main body, and
the movable wing is provided in front of the main wing in the main body and is rotatable about a rotary shaft extending horizontally from the main body.

5. The wide area sensor system according to claim 1,
wherein the external control apparatus extracts a necessary inspection point in the detection target based on a detection result of the high speed sensing and performs the low speed sensing on the extracted necessary inspection point.

6. The wide area sensor system according to claim 1,
wherein the external control apparatus moves the unmanned airplane to a predetermined necessary reconnaissance point in the detection target while performing the high speed sensing on the detection target, and performs the low speed sensing on the necessary reconnaissance point.

7. An in-flight detection method using an unmanned airplane being switchable between an airplane mode for high speed flight and a VTOL mode for low speed flight and a state detection sensor provided in the unmanned airplane, the state detection sensor being driven to detect a state of a detection target, the method comprising the steps of:

performing high speed sensing by driving the state detection sensor while performing the high speed flight of the unmanned airplane in the airplane mode; and performing low speed sensing by driving the state detection sensor while performing the low speed flight of the unmanned airplane in the VTOL mode.

8. A non-transitory computer readable medium storing program for executing control process with an external control apparatus, the control process comprising:

performing high speed sensing by driving a state detection sensor provided in an unmanned airplane to detect a state of a detection target while performing high speed flight of the unmanned airplane in an airplane mode, and performing low speed sensing by driving the state detection sensor to detect the state of the detection target while performing low speed flight of the unmanned airplane in a VTOL mode.

* * * * *